US008914422B2

(12) United States Patent
Hale et al.

(10) Patent No.: US 8,914,422 B2
(45) Date of Patent: Dec. 16, 2014

(54) METHODS AND SYSTEMS FOR DESIGNING AND BUILDING A SCHEMA IN AN ON-DEMAND SERVICES ENVIRONMENT

(75) Inventors: Shannon Patricia Hale, San Francisco, CA (US); Barathkumar Sundaravaradan, San Francisco, CA (US); Joshua Lulewicz, San Francisco, CA (US); Justin Appler, San Francisco, CA (US); Kavitha Musthyala, Dublin, CA (US); Edward Li, Alameda, CA (US); Cordelia McGee-Tubb, San Francisco, CA (US); Luc Marcel Giavelli, San Francisco, CA (US); Joshua M. Roe, Pacifica, CA (US); Shawna A. Wolverton, Oakland, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/313,918

(22) Filed: Dec. 7, 2011

(65) Prior Publication Data
US 2013/0046799 A1    Feb. 21, 2013

Related U.S. Application Data

(60) Provisional application No. 61/525,578, filed on Aug. 19, 2011.

(51) Int. Cl.
*G06F 17/30*    (2006.01)
(52) U.S. Cl.
USPC ............................ 707/805; 707/601; 707/791

(58) Field of Classification Search
USPC ........................ 707/790, 803, 805, 999.1, 601
See application file for complete search history.

(56) References Cited

U.S. PATENT DOCUMENTS 5,701,453 A * 12/1997 Maloney et al. ............... 707/714
5,715,450 A    2/1998 Ambrose et al.
5,821,937 A    10/1998 Tonelli et al.
(Continued)

FOREIGN PATENT DOCUMENTS

EP              1367503 A1 * 12/2003 ............. G06F 17/30
WO    WO/2007/030796 A2    3/2007
WO    WO/2008/042980 A2    4/2008

OTHER PUBLICATIONS

Hartwick College Technology Services; MS Access Table Properties and Relationships; "http://www.hartwick.edu/Prebuilt/TechServ_Access_TablesRelationships.pdf"; 2005.*

(Continued)

*Primary Examiner* — Dennis Truong
(74) *Attorney, Agent, or Firm* — Dergosits & Noah LLP; Todd A. Noah

(57) ABSTRACT

Methods and systems are provided for displaying a graphical representation of data objects of a schema using an online tool. In an embodiment, the online tool may be used to create or modify a schema. Modifying a schema may include adding or modifying or deleting data objects. Modifying data objects may include adding or modifying or deleting data fields. The online tool may be used to define relationships between data objects. In an embodiment, user permissions may be set for data objects. In an embodiment, the graphical representations of data objects may be selected and placed is a different location.

19 Claims, 30 Drawing Sheets

(56) References Cited

U.S. PATENT DOCUMENTS

| | | |
|---|---|---|
| 5,831,610 A | 11/1998 | Tonelli et al. |
| 5,873,096 A | 2/1999 | Lim et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,549,908 B1 | 4/2003 | Loomans |
| 6,553,563 B2 | 4/2003 | Ambrose et al. |
| 6,574,635 B2 | 6/2003 | Stauber et al. |
| 6,577,726 B1 | 6/2003 | Huang et al. |
| 6,604,117 B2 | 8/2003 | Lim et al. |
| 6,604,128 B2 | 8/2003 | Diec |
| 6,609,150 B2 | 8/2003 | Lee et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,827,138 B2 | 11/2010 | Salmon et al. |
| 7,949,684 B2 | 5/2011 | Brooks et al. |
| 8,015,058 B2 | 9/2011 | Fowler et al. |
| 8,024,701 B2 * | 9/2011 | Cote .................. 717/106 |
| 8,095,531 B2 | 1/2012 | Weissman et al. |
| 8,161,010 B2 | 4/2012 | Weissman et al. |
| 8,204,855 B2 | 6/2012 | Salmon et al. |
| 8,244,759 B2 | 8/2012 | Brooks et al. |
| 8,266,138 B1 | 9/2012 | Collins et al. |
| 8,296,161 B2 | 10/2012 | Polcari et al. |
| 8,332,435 B2 | 12/2012 | Ballard et al. |
| 8,332,436 B2 | 12/2012 | Ballard et al. |
| 8,332,437 B2 | 12/2012 | Ballard et al. |
| 8,365,138 B2 * | 1/2013 | Iborra et al. ............ 717/104 |
| 8,386,471 B2 | 2/2013 | Collins et al. |
| 8,407,338 B2 | 3/2013 | Brady |
| 8,443,085 B2 | 5/2013 | Jensen-Horne et al. |
| 8,447,754 B2 | 5/2013 | Weissman et al. |
| 8,452,726 B2 | 5/2013 | Kuruganti et al. |
| 8,453,196 B2 | 5/2013 | Lerner et al. |
| 8,453,201 B2 | 5/2013 | Lerner et al. |
| 8,453,202 B2 | 5/2013 | Lerner et al. |
| 8,453,203 B2 | 5/2013 | Lerner et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0120711 A1 * | 6/2003 | Katz .................. 709/106 |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0027752 A1 * | 2/2005 | Gelbard .................. 707/200 |
| 2005/0050555 A1 | 3/2005 | Exley et al. |
| 2005/0091098 A1 | 4/2005 | Brodersen et al. |
| 2005/0172261 A1 * | 8/2005 | Yuknewicz et al. .......... 717/106 |
| 2006/0064647 A1 * | 3/2006 | Tapuska et al. ............ 715/800 |
| 2007/0088741 A1 | 4/2007 | Brooks et al. |
| 2007/0156740 A1 * | 7/2007 | Leland et al. ............. 707/102 |
| 2008/0082540 A1 | 4/2008 | Weissman et al. |
| 2008/0082555 A1 | 4/2008 | Salmon et al. |
| 2008/0082572 A1 | 4/2008 | Ballard et al. |
| 2008/0086447 A1 | 4/2008 | Weissman et al. |
| 2008/0086514 A1 | 4/2008 | Weissman et al. |
| 2008/0244510 A1 * | 10/2008 | Cote .................. 717/108 |
| 2010/0070323 A1 | 3/2010 | Polcari et al. |
| 2010/0070528 A1 | 3/2010 | Collins et al. |
| 2010/0088636 A1 | 4/2010 | Yerkes et al. |
| 2010/0185593 A1 | 7/2010 | Wong et al. |
| 2010/0205243 A1 | 8/2010 | Brady |
| 2010/0223100 A1 | 9/2010 | Lee et al. |
| 2010/0223284 A1 | 9/2010 | Brooks et al. |
| 2010/0223467 A1 | 9/2010 | Dismore et al. |
| 2010/0235322 A1 | 9/2010 | Kuruganti et al. |
| 2010/0281515 A1 | 11/2010 | Lerner et al. |
| 2011/0004668 A1 | 1/2011 | Salmon et al. |
| 2011/0023017 A1 | 1/2011 | Calvin |
| 2011/0029879 A1 | 2/2011 | Calvin |
| 2011/0131314 A1 | 6/2011 | Lerner et al. |
| 2011/0196883 A1 | 8/2011 | Brooks et al. |
| 2011/0202508 A1 | 8/2011 | Brooks et al. |
| 2011/0202911 A1 | 8/2011 | Brooks et al. |
| 2011/0209121 A1 | 8/2011 | Nagata et al. |
| 2011/0213789 A1 | 9/2011 | Doshi et al. |
| 2011/0214067 A1 | 9/2011 | Tanaka |
| 2011/0224973 A1 | 9/2011 | Tamm et al. |

(56) References Cited

U.S. PATENT DOCUMENTS

| | | |
|---|---|---|
| 2011/0225217 A1 | 9/2011 | Plax et al. |
| 2011/0225232 A1 | 9/2011 | Casalaina et al. |
| 2011/0225233 A1 | 9/2011 | Casalaina et al. |
| 2011/0225495 A1 | 9/2011 | Casalaina et al. |
| 2011/0225500 A1 | 9/2011 | Casalaina et al. |
| 2011/0225506 A1 | 9/2011 | Casalaina et al. |
| 2011/0225527 A1 | 9/2011 | Law et al. |
| 2011/0238622 A1 | 9/2011 | Walters et al. |
| 2011/0238705 A1* | 9/2011 | Baker et al. .................. 707/802 |
| 2011/0238707 A1 | 9/2011 | Wong et al. |
| 2011/0246504 A1 | 10/2011 | Slater et al. |
| 2011/0246527 A1 | 10/2011 | Bitting et al. |
| 2011/0246538 A1* | 10/2011 | Boley et al. .................. 707/805 |
| 2011/0258233 A1 | 10/2011 | Unger et al. |
| 2011/0258628 A1 | 10/2011 | Devadhar |
| 2011/0276610 A1 | 11/2011 | Hossain et al. |
| 2011/0276674 A1 | 11/2011 | Jensen-Horne et al. |
| 2011/0276693 A1 | 11/2011 | Jensen-Horne et al. |
| 2011/0276890 A1 | 11/2011 | Jensen-Horne et al. |
| 2011/0276892 A1 | 11/2011 | Jensen-Horne et al. |
| 2011/0276945 A1 | 11/2011 | Chasman et al. |
| 2011/0282833 A1 | 11/2011 | Ramsey et al. |
| 2011/0282899 A1 | 11/2011 | Mathew et al. |
| 2011/0289140 A1 | 11/2011 | Pletter et al. |
| 2011/0289141 A1 | 11/2011 | Pletter et al. |
| 2011/0289425 A1 | 11/2011 | Pletter et al. |
| 2011/0289475 A1 | 11/2011 | Sukhenko et al. |
| 2011/0289476 A1 | 11/2011 | Pletter et al. |
| 2011/0289479 A1 | 11/2011 | Pletter et al. |
| 2011/0295838 A1 | 12/2011 | Collins et al. |
| 2011/0295839 A1 | 12/2011 | Collins et al. |
| 2011/0295910 A1 | 12/2011 | Ziemann et al. |
| 2011/0296298 A1 | 12/2011 | Ahuja et al. |
| 2011/0296336 A1 | 12/2011 | Law et al. |
| 2011/0296375 A1 | 12/2011 | Mooney |
| 2011/0296381 A1 | 12/2011 | Mooney |
| 2011/0296386 A1 | 12/2011 | Woollen et al. |
| 2011/0296413 A1 | 12/2011 | Wood et al. |
| 2011/0302133 A1 | 12/2011 | Kuruganti et al. |
| 2011/0314341 A1 | 12/2011 | Varadharajan |
| 2011/0314420 A1 | 12/2011 | McFarlane et al. |
| 2012/0042279 A1 | 2/2012 | Naderi |
| 2012/0054241 A1 | 3/2012 | Brooks et al. |
| 2012/0054328 A1 | 3/2012 | Brooks et al. |
| 2012/0054632 A1 | 3/2012 | Ballard et al. |
| 2012/0054633 A1 | 3/2012 | Ballard et al. |
| 2012/0059807 A1 | 3/2012 | Brooks et al. |
| 2012/0059862 A1 | 3/2012 | Brooks et al. |
| 2012/0059925 A1 | 3/2012 | Lerner et al. |
| 2012/0059933 A1 | 3/2012 | Lerner et al. |
| 2012/0060199 A1 | 3/2012 | Lerner et al. |
| 2012/0060200 A1 | 3/2012 | Lerner et al. |
| 2012/0072832 A1 | 3/2012 | Tanaka |
| 2012/0079038 A1 | 3/2012 | Hersh |
| 2012/0079560 A1 | 3/2012 | Lerner et al. |
| 2012/0084266 A1 | 4/2012 | Brooks et al. |
| 2012/0084638 A1 | 4/2012 | Calvin et al. |
| 2012/0089550 A1 | 4/2012 | Arora et al. |
| 2012/0089610 A1 | 4/2012 | Agrawal et al. |
| 2012/0096046 A1 | 4/2012 | Kucera |
| 2012/0101985 A1 | 4/2012 | Kemp et al. |
| 2012/0102063 A1 | 4/2012 | Kemp et al. |
| 2012/0102114 A1 | 4/2012 | Dunn et al. |
| 2012/0102153 A1 | 4/2012 | Kemp et al. |
| 2012/0102402 A1 | 4/2012 | Kwong |
| 2012/0102420 A1 | 4/2012 | Fukahori |
| 2012/0110020 A1 | 5/2012 | Weissman et al. |
| 2012/0117217 A1 | 5/2012 | Lerner et al. |
| 2012/0117613 A1 | 5/2012 | Lerner et al. |
| 2012/0131555 A1 | 5/2012 | Hossain et al. |
| 2012/0143817 A1 | 6/2012 | Prabaker et al. |
| 2012/0143917 A1 | 6/2012 | Prabaker et al. |
| 2012/0166871 A1 | 6/2012 | Weissman et al. |
| 2012/0173485 A1 | 7/2012 | Kothule et al. |
| 2012/0179762 A1 | 7/2012 | Arora et al. |
| 2012/0191865 A1 | 7/2012 | Duff et al. |
| 2012/0209586 A1 | 8/2012 | Mieritz et al. |
| 2012/0215705 A1 | 8/2012 | Porro et al. |
| 2012/0223951 A1 | 9/2012 | Dunn et al. |
| 2012/0233354 A1 | 9/2012 | Salmon et al. |
| 2012/0239629 A1 | 9/2012 | Brooks et al. |
| 2012/0239795 A1 | 9/2012 | Lerner et al. |
| 2012/0240188 A1 | 9/2012 | Lerner et al. |
| 2012/0240189 A1 | 9/2012 | Lerner et al. |
| 2012/0240190 A1 | 9/2012 | Lerner et al. |
| 2012/0246120 A1 | 9/2012 | Brooks et al. |
| 2012/0260191 A1 | 10/2012 | Ballard et al. |
| 2012/0317121 A1 | 12/2012 | Fuchs et al. |
| 2012/0317146 A1 | 12/2012 | Brooks et al. |
| 2012/0317149 A1 | 12/2012 | Jagota et al. |
| 2012/0317495 A1 | 12/2012 | Ballard et al. |
| 2012/0330915 A1 | 12/2012 | Mehra |
| 2012/0330960 A1 | 12/2012 | Koosel et al. |
| 2012/0331000 A1 | 12/2012 | Mehra |
| 2012/0331016 A1 | 12/2012 | Janson et al. |
| 2013/0007148 A1 | 1/2013 | Olsen |
| 2013/0018869 A1 | 1/2013 | Hanson et al. |
| 2013/0019235 A1 | 1/2013 | Tamm |
| 2013/0021370 A1 | 1/2013 | Dunn et al. |
| 2013/0024454 A1 | 1/2013 | Dunn |
| 2013/0024511 A1 | 1/2013 | Dunn et al. |
| 2013/0024788 A1 | 1/2013 | Olsen et al. |
| 2013/0031172 A1 | 1/2013 | Olsen et al. |
| 2013/0031487 A1 | 1/2013 | Olsen et al. |
| 2013/0031499 A1 | 1/2013 | Vishnubhatta et al. |
| 2013/0041912 A1 | 2/2013 | Arora et al. |
| 2013/0042146 A1 | 2/2013 | Unger et al. |
| 2013/0046789 A1 | 2/2013 | Lulewicz |
| 2013/0046799 A1 | 2/2013 | Hale et al. |
| 2013/0054517 A1 | 2/2013 | Beechuk et al. |
| 2013/0054582 A1 | 2/2013 | Macklem et al. |
| 2013/0054648 A1 | 2/2013 | Mehta et al. |
| 2013/0054714 A1 | 2/2013 | Bedi |
| 2013/0055147 A1 | 2/2013 | Vasudev et al. |
| 2013/0060859 A1 | 3/2013 | Olsen et al. |
| 2013/0085745 A1 | 4/2013 | Koister et al. |
| 2013/0091149 A1 | 4/2013 | Dunn et al. |
| 2013/0091217 A1 | 4/2013 | Schneider |
| 2013/0091229 A1 | 4/2013 | Dunn et al. |
| 2013/0091286 A1 | 4/2013 | Spencer |
| 2013/0097253 A1 | 4/2013 | Mencke |
| 2013/0097540 A1 | 4/2013 | Ballard et al. |
| 2013/0117353 A1 | 5/2013 | Wong et al. |
| 2013/0132861 A1 | 5/2013 | Kienzle et al. |

OTHER PUBLICATIONS

PC Network Advisor; Understanding MS Access Security; "http://www.techsupportalert.com/pdf/t1526.pdf"; 2000.*

Peter Rob et al. "Database Systems Degin, Implementation and Management"; http://cws.cengage.co.uk/rcc_databases/students/accesstutorial.pdf; 2008.*

Embarcadero; "ER/Studio Data Architect Quick Start Guide" 2nd edition; Dec. 2010.*

Washington University; "http://courses.washington.edu/benefit/fluency/course/lab_docs/lab11/lab11.pdf" ;Aug. 22, 2005.*

Robin Beaumont; "System architect ERD Tutorial 2; Complex ERDs-Data Modelling"; May 1, 2004.*

"DB-VA Designers Guide"; "http://media.visual-paradigm.com/media/documents/dbva40dg/pdf/dbva_designer_guide_chapter4.pdf"; Chapter 4, "Designing Data Model by Enity Relationship Diagram" Jan. 6, 2007.*

HP; "Creating Entity Relationship Diagrams (ERDs) for ServiceCenter"; "http://h20229.www2.hp.com/products/ovsc/twp/ovsc_twp_erd.pdf" ; Jan 13, 2007.*

Embarcadero Technologies; "ER/Studio® Data Architect"; Published Oct. 2010;Version 9.0; http://docs.embarcadero.com/products/er_studio/erstudio9.0/ERStudioDAUserGuide.pdf.*

* cited by examiner

METHODS AND SYSTEMS FOR DESIGNING AND BUILDING A SCHEMA IN AN ON-DEMAND SERVICES ENVIRONMENT

CLAIM OF PRIORITY

This application claims the benefit of U.S. Provisional Patent Application 61/525,578 entitled, METHODS AND SYSTEMS FOR DESIGNING AND BUILDING A SCHEMA IN AN ON-DEMAND SERVICES ENVIRONMENT By Shannon Hale, filed Aug. 19, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

The following commonly owned, co-pending United States patents and patent applications, including the present application, are related to each other. Each of the other patents/applications are incorporated by reference herein in its entirety:

U.S. patent application Ser. No. 13/313,918 entitled METHODS AND SYSTEMS FOR DESIGNING AND BUILDING A SCHEMA IN AN ON-DEMAND SERVICES ENVIRONMENT By Shannon Hale, filed Dec. 7, 2011;

U.S. patent application Ser. No. 13/314,111 entitled METHODS AND SYSTEMS FOR PROVIDING SCHEMA LAYOUT IN AN ON-DEMAND SERVICES ENVIRONMENT By Josh Lulewicz, filed Dec. 7, 2011;

U.S. Provisional Patent Application 61/525,578 entitled, METHODS AND SYSTEMS FOR DESIGNING AND BUILDING A SCHEMA IN AN ON-DEMAND SERVICES ENVIRONMENT By Shannon Hale, filed Aug. 19, 2011 Attorney Docket No. 48-71/725PROV.

FIELD OF THE INVENTION

One or more implementations relate generally to designing and building schema.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using software applications installed on the user's own systems. A user system might remotely access one of a plurality of server systems that might in turn access the database system. Cloud computing allows users to access applications and services through a web browser. By doing so, users avoid having to download and install software applications onto their own machines. Cloud computing also allows for seamless upgrading of cloud based software by the provider, without inconveniencing the user of the software by requiring the user to be involved in the software upgrade process.

As cloud computing grows in popularity, there exists a need for tools that allow users to customize, develop, and enhance the systems the users use to better suit the users' needs. More specifically, online tools that allow a user to perform development through a web browser anywhere, anytime, or on any machine with a web browser and an internet connection. Many cloud computing services provide database and/or database like functionality. Unfortunately, cloud computing services do not provide convenient online tools for designing and building databases, or online database schema.

Accordingly, it is desirable to provide techniques for enabling the designing and building of schema in an on-demand services environment to improve the efficiency and convenience of system development.

BRIEF SUMMARY

In accordance with embodiments, there are provided mechanisms and methods for designing and building a schema in an on-demand service in a database system. These mechanisms and methods for designing and building a schema in an on-demand service in a database system can enable embodiments to provide users with an online tool for customizing, developing, and enhancing their online databases. The ability of embodiments to provide an online tool for customizing, developing, and enhancing their online databases can enable users to efficiently create and/or modify an existing database schema.

In an embodiment and by way of example, a method for designing and building a schema in an on-demand service is provided. The method embodiment includes providing a set of online tools to allow a user to define elements of a database schema, receiving user input that manipulates the set of online tools, and automatically altering the database schema based on the user input.

While the present invention is described with reference to an embodiment in which techniques for on-demand communities are implemented in a system having an application server providing a front end for an on-demand database service capable of supporting multiple tenants, the present invention is neither limited to multi-tenant databases nor deployment on application servers. Embodiments may be practiced using other database architectures, i.e., ORACLE®, DB2®, by IBM, and the like, or no database at all, without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples of the invention, the invention is not limited to the examples depicted in the figures.

DETAILED DESCRIPTION

General Overview

Systems and methods are provided for providing an online tool for designing and building a schema in an on-demand services environment.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Next, mechanisms and methods for providing an online tool for designing and building a schema in an on-demand services environment will be described with reference to example embodiments.

Designing and Building Schema

Figure 1:
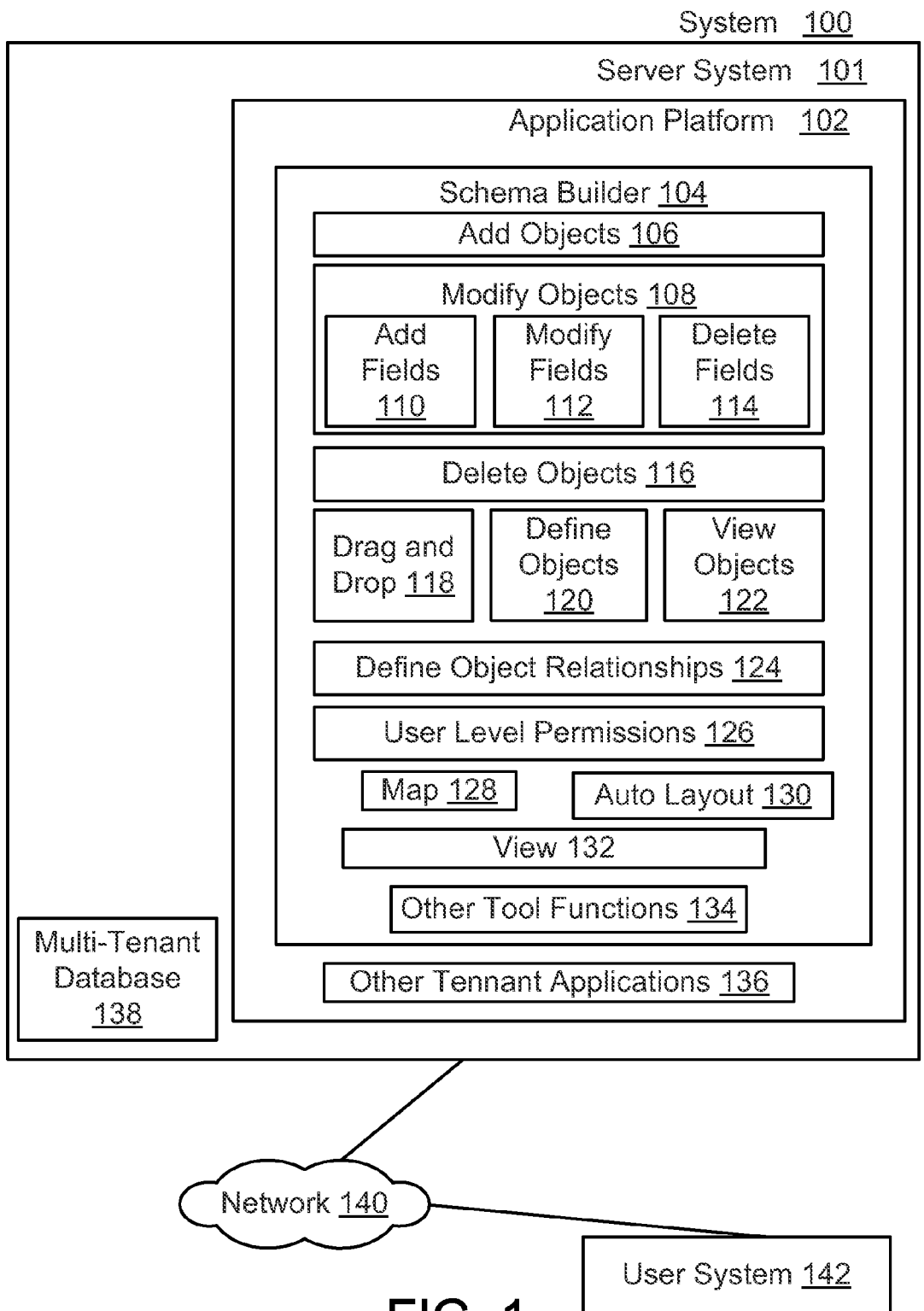
FIG. 1 shows a block diagram of an embodiment of a system for providing an online tool for designing and building a schema in an on-demand services environment.

FIG. 1 shows a block diagram of an embodiment of system 100 for providing an online tool for designing and building a schema in an on-demand services environment. System 100 may include server system 101, application platform 102, schema builder 104, add objects 106, modify objects 108, add fields 110, modify fields 112, delete fields 114, delete objects 116, drag and drop 118, define objects 120, view objects 122, define object relationships 124, user level permissions 126, map 128, auto layout 130, map 130, other tool functions 132, other tenant applications 134, multi-tenant database 136, network 138, and user system 140. In other embodiments, system 100 may not have all of the elements listed and/or may have other elements instead of or in addition to those listed.

System 100 may be a system for providing tools for displaying the schema in the schema builder one more processes executing on behalf of a tenant in a portion of a multi-tenant database system shared between multiple tenants. For example, a tenant may be one of multiple tenants sharing a database system with each tenant having the database system performing different requirements and functions for each tenant.

Server system 101 may be a system for serving clients of a multitenant database. Server system 101 may include multiple servers and/or multiple machines on which the server applications run. Server system 101 may be part of system 100. Server system 101 may include multi-tenant database for storing the tenant data, a database, and an application platform. Server system 101 may run machine instructions, and may include a memory storing machine instructions for a variety of applications. Server system 101 may receive requests from tenant machines (either directly from one of the tenant machines or via a web-based tool), compute a response (e.g., by retrieving data or running an application), and returns the results to the machine making the request. Server system 101 may be discussed further in conjunction with FIG. 24, below.

Application platform 102 may be a platform for hosting a schema builder along with other tools in a multi-tenant database system. Application platform 102 facilitates the receipt, by the schema builder, of input from a user system via a network, and sends queries to a database (e.g., a multi-tenant database). In an embodiment, application platform 102 may include a schema builder. Application platform 102 may be the application platform that will be discussed in conjunction with FIG. 24, below. Each tenant may have its own application platform running within the multi-tenant database system performing the functions required by each respective tenant.

Schema builder 104 may be an online tool for performing various database functions such as viewing and modifying a schema of a tenant of the multi-tenant database system. The schema of a database may be the description of the structure of a database including the organization of data objects, the relationships of the data objects, and/or the constraints on the data objects. Schema builder 104 may be a tool accessed using any machine with a web browser and internet connection to customize, create, develop, and/or enhance the schema of the database system, which may be available to a user anytime and anyplace. In an embodiment, a user can use schema builder tool 104 to view and modify an existing schema. In an embodiment, schema builder 104 may graphically display all or selected portions of a schema. Schema builder 104 may also graphically represent the relationships between data objects of the schema. Database objects may be elements of data within a database system, or pieces of information that correspond, in some manner, to data in the database system. In one example, schema builder 104 may organize the data objects based on the relationship of the data objects with other data objects. Schema builder 104 may be a tool to describe and visualize the data objects, the fields of the data objects, and/or the relationships between the data objects in an interactive relationship diagram (e.g., an Entity Relationship Diagram format). In an embodiment, schema builder 104 may provide a canvas for displaying the visual description of data and a navigation window with options for selecting various data objects, defining the data objects, and/or viewing a visual depiction of the relationships between data objects (e.g., in an ERD format). The navigation window may list options for controlling which data objects are displayed, along with interface elements (e.g., check boxes) for selecting display options and/or for adjusting the manner the data objects are displayed on the canvas. Schema Builder 104 may also depict relationships among data objects that are displayed on the canvas, as mentioned above. Lookup relationships may be visually represented by lines connecting the related objects. In an embodiment, a database element (e.g., a field or a data object representing a field) of one table may look up and/or make use of data from another table. The relationship between the table that receives and/or makes use of the data that is looked up, and the relationship with the table that provides the information that was looked up may be referred to as a "lookup relationship." In an embodiment, holding a mouse over a look-up relationship may cause an information box to appear on the screen with information about the relationship. Master-detail relationships may be visually represented by lines connecting the data objects related to one another in a master-detail relationship. The master-detail relationship is a special type of parent-child relationship between data objects where one data object is a master and the other data objects are children. The child object may describe details of the master object. In an embodiment, the relationship field is required for all detail records. In an embodiment, the relationship field cannot be changed after creating and saving the relationship field. The ownership and sharing of a detail record may be determined by the master data object. In an embodiment, when a user deletes the master record, all detail records are deleted. In an embodiment, a user can create rollup summary fields on the master record to summarize the detail records (a rollup is any aggregation of data, such as a total, median, average, or standard deviation). In an embodiment, the relationship field allows users to click on a lookup icon to select a value from a popup list, and the master object is the source of the values in the list. The connecting lines representing the master-detail relationships are of a different type (e.g., color, thickness, contiguity), having a different graphical appearance, than the lines representing the lookup relationships. Schema builder 104 displays a graphical representation of all data objects, fields of objects, and/or relationships between objects. The master-detail relationships and lookup relationships are represented with lines that may have different colors (and/or other visually distinctive characteristics) that help identify which type of relationships are being represented by the lines. The schema builder 104 may provide the ability to switch views between a view showing the labels of objects and fields and a view showing the API names of the same objects and fields.

Schema builder 104 may contain the various components that a user would use to view and/or modify an existing schema. Add objects 106 may be a process used to add data objects to the database (or portion of the database) the schema is a representation of, and in turn, a graphical representation of the data objects is added to the schema (e.g., a visual depiction of the data objects is rendered for display). Add objects 106, adds a data object to the schema. In an embodiment, add object 106, adds an existing object (e.g., an object that already existed in a database) to the schema. The data object may be chosen from the data object type such as standard data object or custom data object or system data objects. Adding a data object may involve selecting an interactive element from a list on the navigation window for adding (i.e. creating) a data object. In an embodiment, the interactive element may be a draggable icon, and data objects are created by dragging and dropping the icon onto the canvas.

Modify objects 108 may be a function used for changing characteristics of a data object. For example, modify objects 108 may be used to change the fields of a data object or the data in the fields of a data object. Modify objects 108 may contain add fields 110, which may be used for adding new and/or additional fields to a data object. Modify objects 108 may also contain modify fields 112, which may be used for modifying the contents and/or properties of fields associated with a data objects or modifying the name of fields of a data object. Modify objects 108 may also contain delete fields 114, which may be used for removing fields from a data object.

Delete objects 116 may be a feature used for removing data objects from a database, and in turn, Delete object 116 may also delete a visual depiction of the data object from a schema and/or from the display (e.g., the schema that graphically represents the data objects for display on the canvas). Drag and drop 118 may be an algorithm for adding data objects to a database, or modifying the data objects, in response to a user's interactions with schema builder 104. Drag and drop 118 may be a feature which can be used to conveniently add objects to a schema, create relationships between objects, and/or add fields to objects by dragging and dropping selections such as a selected menu item. For example, a user may use a pointing device such as a mouse to select a new custom object from a list of available schema elements, drag the new custom object onto the canvas for display, and drop the new custom object onto the schema.

Define objects 120 may be a feature used for initially populating the fields of a data object. For example, once a data object is added to a schema, a user may be presented with a dialogue box requesting the user to specify certain identifying information about the newly added object. In an embodiment, the identifying information may include the name of the data object, description of the data object, a label for the data object, and the plural form of the label for the data object.

View objects 122 may be an algorithm/feature for receiving a selection from a user of schema builder 104 that specifies which objects and elements the user wishes to have displayed. The algorithm of view objects 122 may then render a visual representation of the objects and elements in one or more display areas (e.g., canvas 415, and map 434, discussed below). For example, a user may choose an option for viewing all objects available for viewing via the schema or an option for viewing only a selected subset of the objects available for viewing via the schema. The user may choose an option for viewing or hiding relationships between objects. As discussed above, the algorithm of view objects 122 may handle the user's selections, and make the selected objects viewable or non-viewable, according to the user's selections. View objects 122 may also generate expanded and/or collapsed views of data objects in a schema. The algorithm of visual objects 122 may provide information for populating an expanded view of a data object in the schema builder. The expanded view may show the fields of the data object that were not viewable in other views (e.g., a collapsed view). The collapsed view may hide the fields of the data object (e.g., the fields to be hidden may not be visually rendered for display). The algorithm of view objects 122 may cause element labels to be displayed or hidden, based on user input. The algorithm of view objects 122 may cause a navigation window, a graphical selector for zooming a view of the canvas in or out, and/or a legend or system fields to be shown or hidden a navigation window, based on user input. View objects 122 may cause a list of objects to be displays, based on user input. Define object relationships 124 may be an algorithm for receiving input from a user of a tool (i.e., the schema builder), and based on the input, establishing relationships between at least two data objects of a database. In an embodiment, the visual depiction of the objects is updated to display the relationship between data objects, and the relationship type. For example, in an embodiment, define object relationships 124 may cause, in response to user interaction with the schema builder, a dialogue box to be presented to a user. The dialogue box may request relationship specifying information, such as an indication of which object is intended to be related to the current object, which object is the child, and what the name of the relationship should be, among other things.

User level permissions 126 may set permissions for various users to access and/or modify the schema and/or elements of the schema. For example, the settings of user level permissions 126 may grant a database administrator or may grant any other user the ability to add, modify, and delete objects. Different users may be granted different levels of permission corresponding to different levels of access. In an embodiment, user level permissions 126 may grant a particular user and/or a particular type of user only the ability to view data objects and fields within the schema. Map 128 may be a map that may assist in navigating the schema, which may be used to determine which part of the schema appears on the canvas, which optionally may be downloaded with the rest of the webpage. Map 128 behaves similar to a two dimensional scroll bar having a smaller graphical representation of the canvas.

Auto layout 130 may be an algorithm to automatically rearrange the locations of the data objects on a canvas. Other tool functions 132 may contain other features and functions of schema builder tool 104 such as an algorithm for determining the placement data objects within a viewing area, based on user input. A data object may be selected on the canvas by a pointing device and placed in a different location on the canvas. Relocating the data object may also cause the redrawing of relationship lines between the objects. Other tools may include various functions that are downloaded to the user system as part of the user interface. System 100 may also include other tenant applications 136. Other tenant applications 136 may be any other applications the tenant chooses to run.

Multi-tenant database 138 may be a database system with multiple tenants that each has a degree of access to at least a portion of the database system that may or may not be the same as the degree of access as other tenants. Each tenant may be an individual or an organization, and each tenant may have representatives, members, employees, customers and/or other entities associated with the tenant, which in turn may also have different degrees of access to the tenant's portion of the database as a result of the tenant's tenancy of the multi-tenant database. The degree of access granted to those associated with the tenant and/or which entities (e.g., representatives, members, employees, customers and/or other entities) that are associated with the tenant may be determined by the tenant. The database system may be a relational database and may include multiple databases, and each database may be partitioned and/or otherwise shared amongst the multiple tenants. Multi-tenant database 138 may have any number of tenants and any number of user systems and may access a portion of the database. Multitenant database 132 may be provided on-demand in that the multi-tenant database and may be provided to the tenant as a service so that the tenant does not need to worry about the details of maintaining the database system. In an embodiment the multitenant database 138 may be a relational database.

Network 140 (which will be further discussed below in conjunction with FIG. 24) may be any network or combination of networks of devices that communicate with one another, such as the Internet, another wide area network, and/or one or more phone networks. Server system 101 may interact with the user systems via network 140 using a network interface (which may be also further discussed in conjunction with FIG. 24). User system 142 may include a plurality of user systems that connect to server system 101, via network 140. User system 142 may be a device having at least one or more processors, a memory system, an input/output system, and a network interface, for example. User system 136 may send a request for the server system to view or create or modify data objects in a schema, via schema builder 104.

User-System Method

Figure 2A:
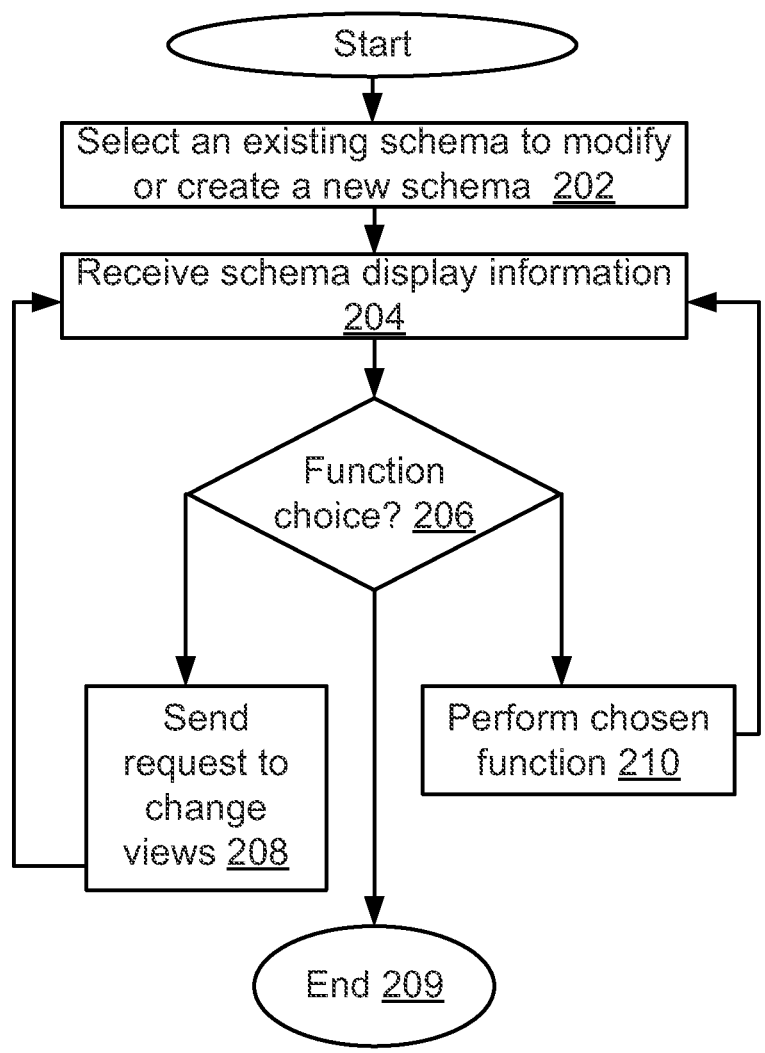
FIG. 2 shows an embodiment of a user-side method of using an online tool for creating a new schema or modifying an existing schema in an on-demand services environment.

FIG. 2A shows an embodiment of a user-side method 200 for using an online tool to create a new schema or modify an existing schema in an on-demand services environment and/or other environment. In step 202, the user system may select an existing schema to modify or create a new schema. In step 204 the user system receives display information about the selected schema. As part of step 204, the user system may receive a user interface that provides a variety of functions that the user may select. In step 206, the user machine waits for user input, and the user may select an element on the user the interface, which may cause the user system to send a request to perform the selected function. The request may be to add an object and/or field to a schema, or to modify an object of a schema, by for example modifying a field of an object. The user interface may include a plurality of tabs, the options that are available to the user may depend on which tab is currently selected. Depending on the user's choice, after step 206, method 200 proceeds to step 208, 210 or terminates. If the user selects a new tab, the method proceeds to step 208, and in step 208 the user system may send a message requesting a updated webpage having an updated view with different functions available. After step 208, the method returns to step 204, and the user system receives an update to user webpage, which includes the requested view and a set of functions that are associated with the requested view. In step 208, the user system may receive a request to define the aspects of a data object, a field of a data object and/or relationship between data objects. For example, the user system may receive a dialogue box with fields to fill out. Returning to step 204, if the user chooses to end the session, method 200 terminates. For example, the user may select a close icon, which may cause the connection to the schema builder to close. Returning again to step 206, the user may select to perform a function available on the current webpage under the current tab. If the user selects to perform a function, the method proceeds to step 210 where the method is performed. Method 210 may involve dragging and dropping interface elements to specific location, which may cause a request to be sent to the server system to create a field, data object, or other item. Method 210 may also send a message to the server system to perform a function that does not involve dragging and dropping, such as changing the layout of the schema on the canvas.

In an embodiment, each of the steps of method 200 is a distinct step. In another embodiment, although depicted as distinct steps in FIG. 2A, step 202-208 may not be distinct steps. In other embodiments, method 200 may not have all of the above steps and/or may have other steps in addition to or instead of those listed above. The steps of method 200 may be performed in another order. Subsets of the steps listed above as part of method 200 may be used to form their own method.

Figure 2B:
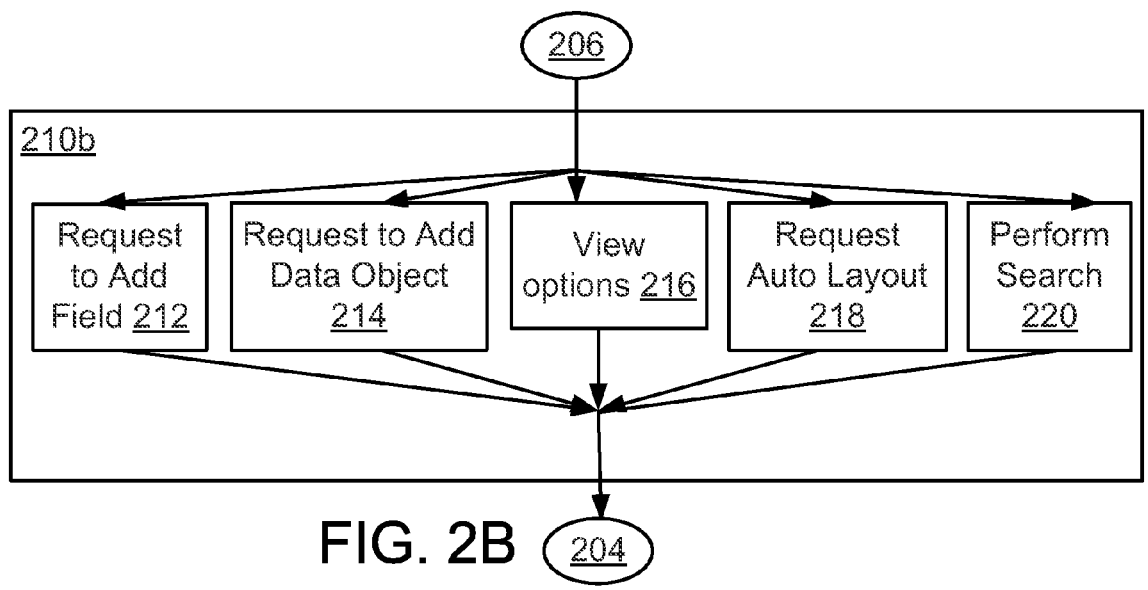
Figure 2C:
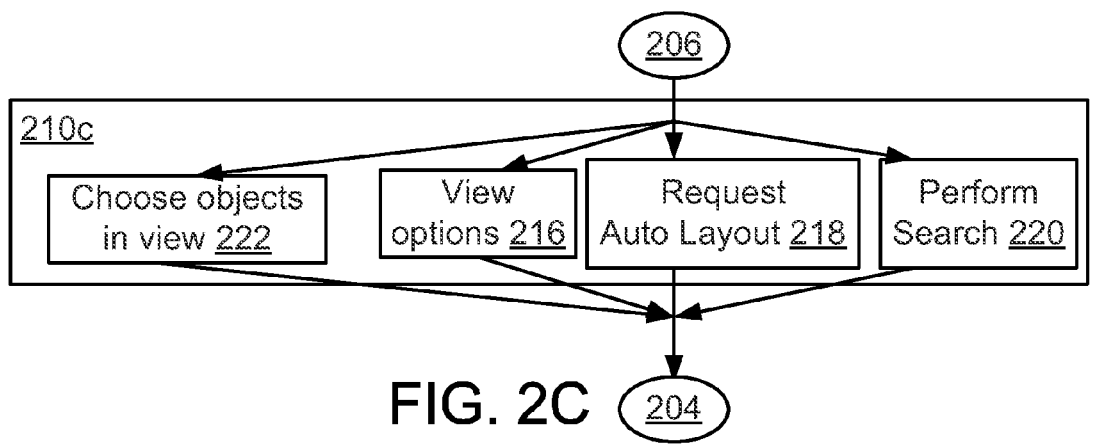

FIGS. 2B and 2C show some of the possible alternative functions that may be performed during step 210, depending on the user's choices. FIG. 2B shows step 210b, which is an embodiment of step 210 of FIG. 2A.

If the user chooses to add a field to an object, then step 210b may involve performing step 212, where a request is sent to the server requesting that the field be added. Step 210b may involve the user selecting a type of field from a menu, and dragging and dropping the field into an object. The dropping of the object may cause the user machine to send a message to the server system requesting that the field be created. As a result of step 212, during step 210, the user receives an updated view of the schema that includes the newly created field. If creating the field creates a relationship, then during step 204 the updated view of the schema may include a graphical representation of the relationship, such as line connecting two objects.

If the user chooses to add a data object, then step 210b may involve performing step 214, where the user requests the creation of a data object. Steps 212 and 214 may involve the user selecting a type of data object from a menu, and dragging and dropping the data object onto the canvas. The dropping of the data object may cause the user machine to send a message to the server system requesting that the data object be created.

As a result of step 214, during step 210, the user receives an updated view of the schema that includes the newly created data object.

During step 206, should the user choose to make a change to the viewing options, method 200 proceeds to step 216. In step 216, the user may click on a tab that causes the user machine to display a list of user viewing options, such as whether the object and/or fields are displayed as expanded or collapsed, whether the graphical representation of the relationships are displayed, whether element labels are displayed, whether the navigation window is displayed, whether the legend is displayed, and/or whether system fields are displayed. A system field may be a field that each object gets automatically (e.g., created by, last modified by, etc.). The legend provides a key that explains the meaning of various graphical symbols, which may appear in a box at an edge of the display area. For example, the legend may include different type of lines followed by a few words describing the meaning of the line. The legend may include one type of line (e.g., a dashed line) followed by the words "master-detail relationship" to indicate that type of line represents a master-detail relationship. The legend may include one type of line (e.g., a solid line) followed by the words "lookup relationship" to indicate that type of line represents a lookup relationship. The legend may include one type of line (e.g., a vertical line) followed by the words "required field" to indicate that fields that that type of line is placed next to are required fields. In an embodiment, the lookup relationships use purple lines, master-detail relationships use blue lines, and/or required fields use red lines. In other embodiments other colors may be used instead. Other legends may also be included instead of or in addition to the legends for the master-detail relationship, lookup relationship, and required fields. In other embodiments, other types of lines (for example, dotted lines, double lines, or lines formed by a variety of different types of shapes) may be used for the lookup relationship, master-detail relationship, and/or required field. In other embodiments, other symbols (other than lines) may be used to represent various features. For example, bullets, squares, arrows, triangles, other polygons, asterisks, or diamonds may be used to represent required fields and/or other types of fields.

Step 206 is a mental step, and could be combined with step 204 (by combining steps 206 and 204, the only steps in the flowchart would be steps that are implemented by the user machine). The alternatives that the user chooses between in step 206 were presented in step 204. If during step 206, the user decides to perform an auto layout, the method 200 proceeds to step 218, where the user may select and auto layout icon or interface element, which may send a request to perform an auto layout. If step 218 is implemented, then in step 204, the graphical representations of the data objects of the graphical representation of the schema are received, which have the data objects rearranged on the canvas in a manner that is expected to be easier for the user to digest and interpret (for example, graphical representations of data objects having more relationships may tend to be placed towards the center of the graphical representation of the schema, and graphical representations of data object having more relationships with one another may tend to be placed closer together).

If during step 206, the user decides to search for a particular text string, then method 200 proceeds to step 220. In step 220, the user enters the search string into a field, and the user optionally selects a user interface element to initiate a search for that string in the graphical representation of the schema. After performing step 220, when the user receives the graphical representation of the schema in step 204, the locations of the occurrences of the string in the graphical representation of the schema may be highlighted and/or the first data object having string may appear in the center of the canvas.

FIG. 2C shows step 210c, which is an embodiment of step 210 of FIG. 2A. Step 210c represents the different steps that the user may choose as part of step 206. Step 210c may include some functions that are different and some functions that are the same as step 210b (FIG. 2B). Whether step 210b or 210c is available to the user may depend on which tab is currently selected. For example, step 210b may be the set of functions on a webpage associated with a tab labeled, "Schema elements" (e.g., the webpage having interface elements associated with step 210b is displayed as a result of the tab "Schema elements" being in a selected state), and step 210c may be the set of functions that are displayed on a webpage associated with tab labeled "Objects" (e.g., the webpage having interface elements associated with step 210c is displayed as a result of the tab "Objects" being in a selected state).

During step 206, when the functions of step 210b are available to the user, the user may choose to perform step 222, and as part of step 222, the user chooses which objects are currently displayed on the canvas. The webpage may include a pulldown menu or other picklist, which displays various options for types of data objects to show on the canvas. For example, there may be an option for displaying only system objects, only standard objects, only custom data objects, only selected data objects, only data objects associated with a particular application, or only data object associated with a particular package (a package may include a set of objects associated with providing a particular type of functionality).

As in step 210b, in step 210c steps 216, 218, and 220 may be performed, which were discussed above in conjunction with FIG. 2B.

Figure 2D:
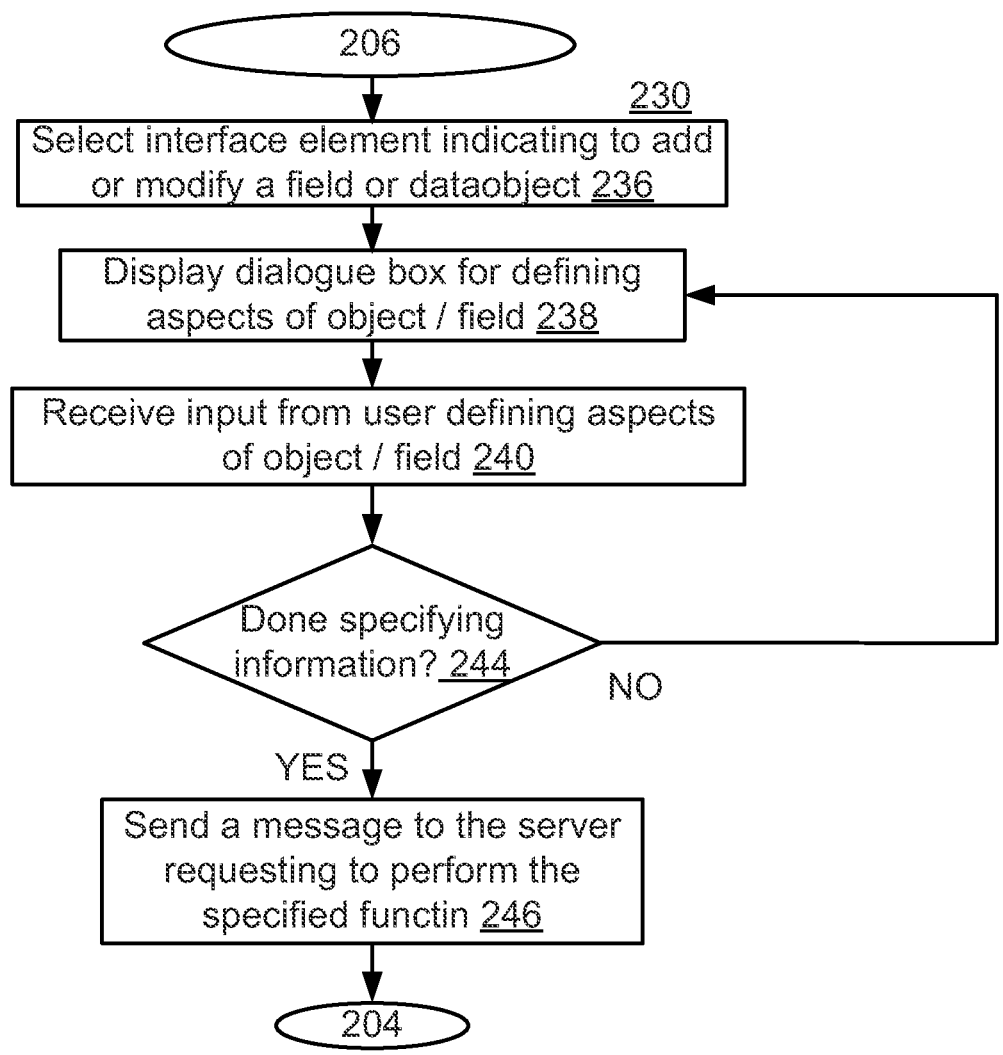

FIG. 2D shows an example of a method 230, which may be used in performing steps 212 and/or 214 of method 200, while creating or modifying an object or a field. Step 206 may be performed prior to performing step 236. In step 236, the user may select a graphical element from a list of graphical elements, each element representing a different type of data object or field, and drags and drops the graphical element to a desired location. In the case of adding a field, the location to which the graphical element is dropped indicates the data object to which the user wishes to add the field. In the case of the adding of an object, the location to which the graphical element is dropped indicates the location to which the user wishes to add the object. Alternatively, the user may select an object to that is already created or a field that is already created and make a change that requires the details of the field or data object to be further defined.

In step 238, in response to the dropping of the graphical element, a dialogue box is generated and displayed on the monitor of the user system. The dialogue box may include a number of fields for defining properties. Some of the fields may be required fields. In step 240 the user fills in the fields. In step 244, the user machine checks whether all of the fields have been filled out correctly and/or that all required fields are filled out. If there are fields that still need to be filled out and/or if some fields have been filled out incorrectly, the user system returns to step 238 to display the dialogue box. Optionally, in step 244, in displaying the dialogue box there may be indications of errors and/or of required fields that were not filled out. Returning to step 238, if the dialogue box is filled out correctly, the method proceeds to step 246 where a message is sent from the user machine to the server to perform the function. The message may include the object type selected (by selecting the corresponding graphical element), the location to add the object to (as inferred from the location of the graphical element that was dropped and/or the object selected), and/or information from the dialogue box. The information sent with the message indicates the function to perform and the data object to which to apply the function. After step 238, the method may proceed to step 204.

Server Side Method

Figure 3A:
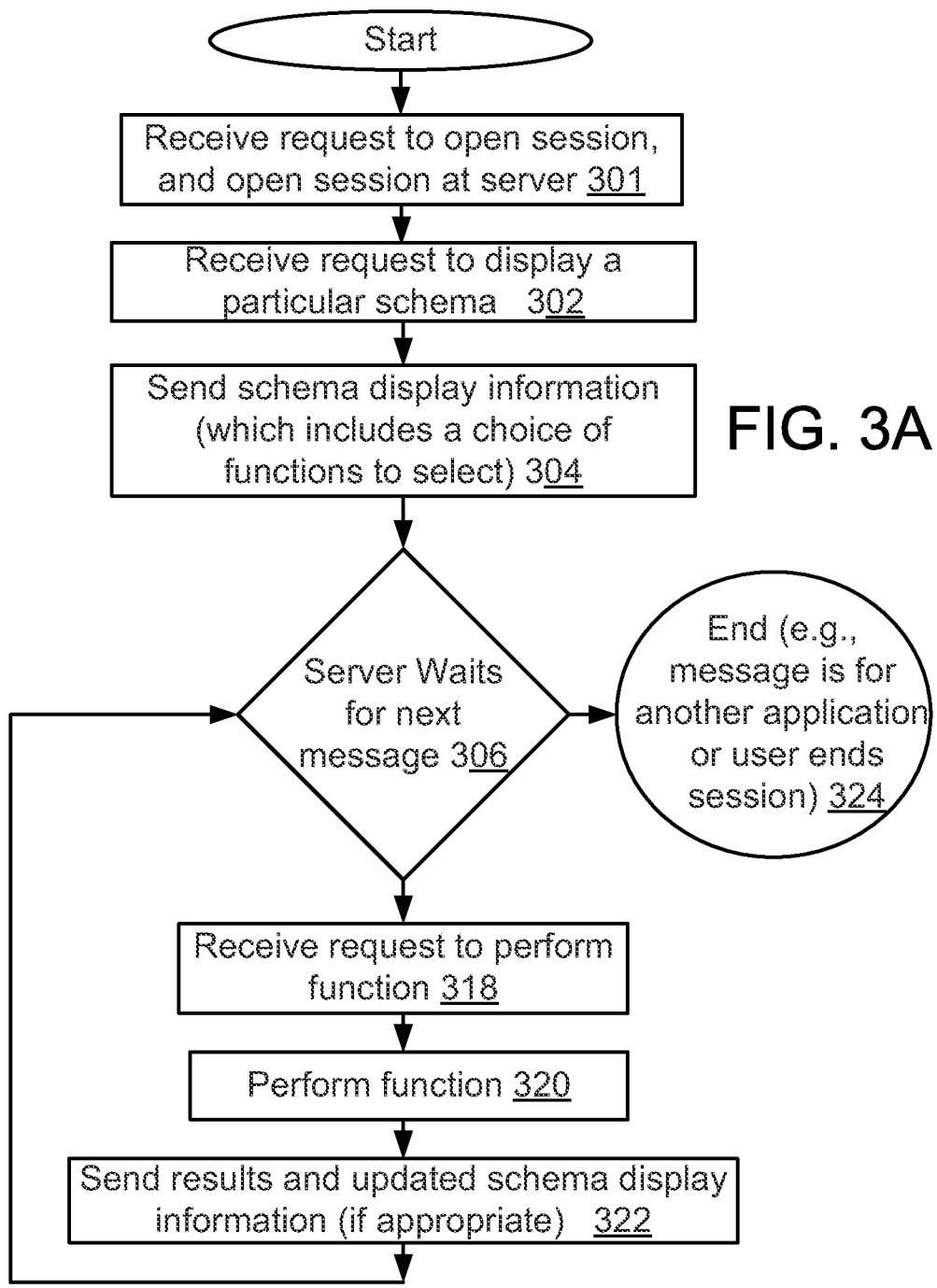
FIG. 3 shows an embodiment of a server-side method of using an online tool for creating a new schema or modifying an existing schema in an on-demand services environment.
Figure 3B:
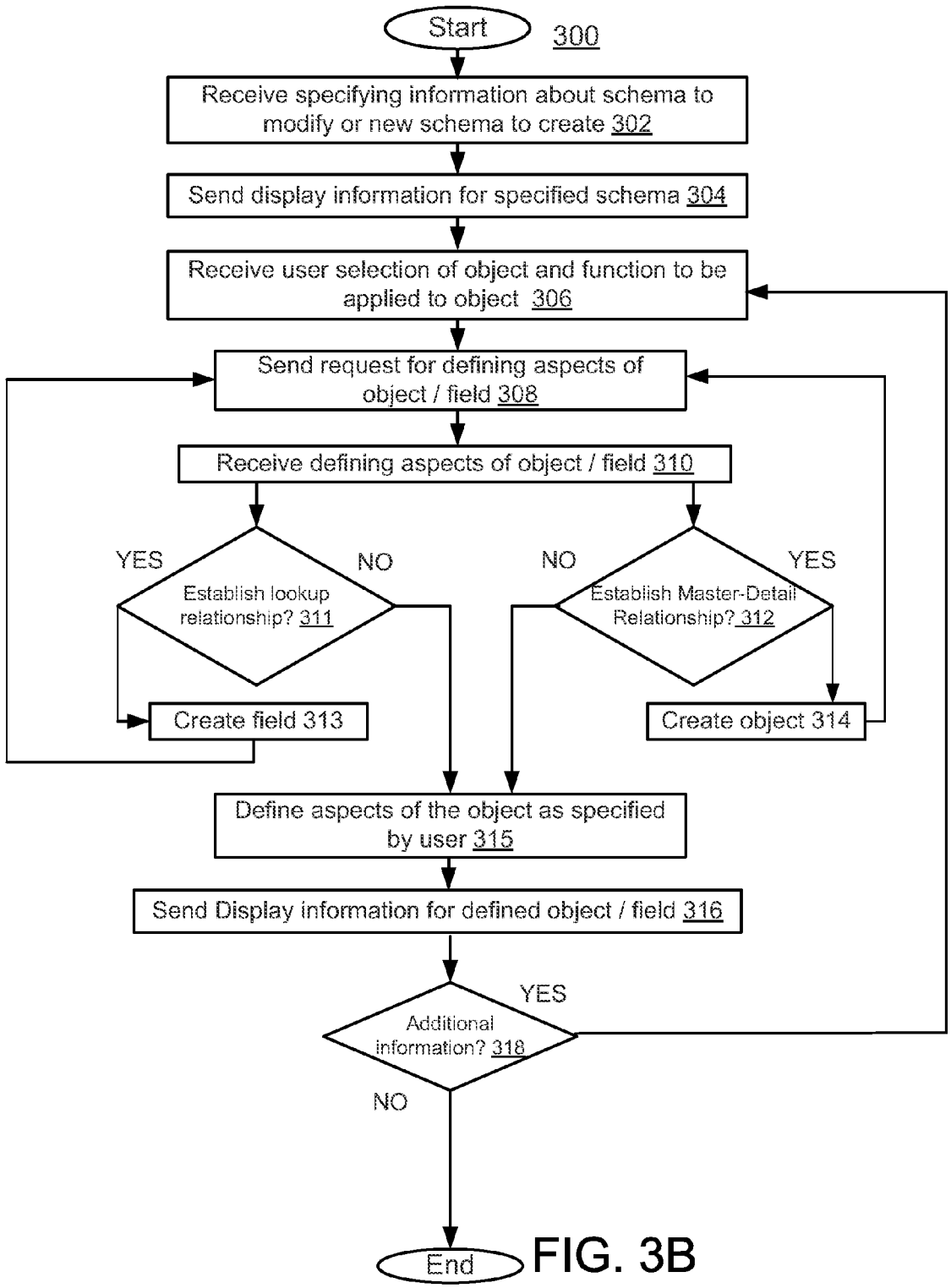

FIG. 3 shows an embodiment of a system-side method 300 for using an online tool to create a new schema or modify an existing schema in an on-demand services environment. In step 301, the server system receives a request to open a session. The session may be opened in conjunction with the user first using another application or in conjunction with logging into the schema builder. The server sends the user system a webpage having an interface for the user to choose a schema to view. The interface may include several functions that are downloaded that as part of the interface, such as a search function, a view options selector, a map for navigating the schema, graphical elements for adding fields to data objects and for adding data objects. In step 302, the server system receives input from a user system indicating the schema that the user would like to view. In step 304, the server sends a graphical representation of the requested schema to the user system. The graphical representation of the schema may include graphical representations of data object and of relationships between data objects. In step 306, the server waits for the next user request. In step 318, the server receives a message from the user. In step 320, the server sends the message to the schema builder application, which processes the message. The message may initiate a function call for rearranging the special relationship between data objects, creating or editing a data object, adding or editing field to a data object, and creating a new graphical representation of the schema based on the changes, for example. In step 322, the server sends the results of step 320 to the user system with an updated graphical representation reflecting the changes for the schema. Next, method 300 returns to step 306. Returning to step 306, the message may request to end the server session and/or the message may be for a different application, as a result of the user having closed the schema builder.

In an embodiment, each of the steps of method 300 is a distinct step. In another embodiment, although depicted as distinct steps in FIG. 3, step 302-322 may not be distinct steps. In other embodiments, method 300 may not have all of the above steps and/or may have other steps in addition to or instead of those listed above. The steps of method 300 may be performed in another order. Subsets of the steps listed above as part of method 300 may be used to form their own method.

Screenshots

Figure 4:
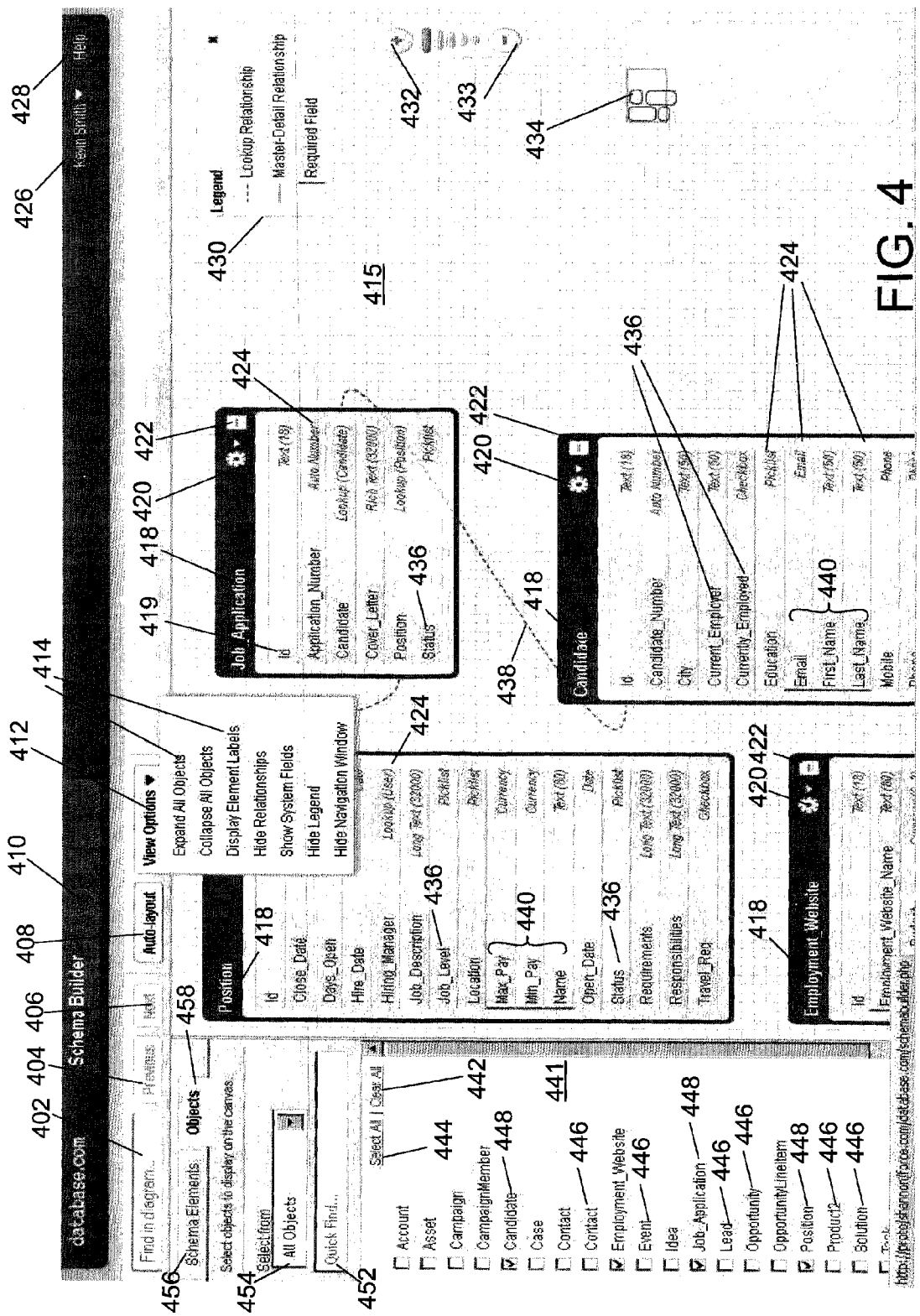
FIG. 4 is a screenshot of an embodiment of an online tool displaying a schema and relationships of objects within the schema.

FIG. 4 is a screenshot of an embodiment schema builder example 400, an online tool displaying a schema and relationships of data objects within the schema. Schema builder example 400 may include find 402, previous button 404, next button 406, auto-layout button 408, schema builder 410, view options 412, options 414, canvas 415, data objects 418, ID fields 419, data object menu 420, Expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, and objects 458. In other embodiments, scheme builder example 400 may not have all of the elements listed and/or may have other elements instead of or in addition to those listed.

Schema builder example 400 shows a screen with a canvas displaying the data objects and a navigation window with a menu. Find 402 is an input box for searching text in the graphical representation of the schema. Entering text and selecting the return button searches the text in the schema and highlights the first encountered search result. Previous button 404, when selected, highlights the previous text from the search results. Next button 406, when selected, highlights the next text result from the search results. Auto-layout button 408, when selected, automatically rearranges the graphical representations of data objects (and, where appropriate, redraws the relationships between the data objects) on the canvas. Schema builder 410 is the current application, which is used for building a schema using graphical representations of data objects within the schema and relationships between the data objects.

View options 412 may be a pull down menu with options for viewing the canvas. Options 414 are the options that are available to the user when view options 414 is selected. For example, view options 412 may allows the user to select whether the data objects on the canvas are displayed in expanded form or collapsed form and/or with element labels or without element labels. View options 412 may allow the user to select whether or not to show relationships, system fields, legends, and/or the navigation window. Options 414 may include options for enabling a user to switch between a view showing the element names of a database object (e.g., fields in a table) and a view showing labels for the same data objects. View options 412 may also include toggle options for switching between a view of the canvas that shows relationships between data objects, and a view of the canvas that does not show the relationships between data objects. View options 412 may also include toggle options for showing or hiding a legend on the canvas. The legend, when visible, provides information that explains what is indicated by the symbolic visual elements shown in the current view. Options 414 may also include toggle options for switching between a view of the navigation window on the left side and a view without the navigation window. Options 414 may also include options for expanding or collapsing all data objects on the canvas. Options 414 may include a toggle input to show or hide relationships.

Canvas 415 is the part of the schema builder for displaying the relationships between the data objects in the database (e.g., the data objects may be displaying in a format that resembles an Entity Relationship Diagram (ERD)). Canvas 415 displays the various graphical representations of data objects in a selected schema, which may include the data object fields and/or the data type, which may be represented by rectangular boxes. The canvas may also display a graphical representation of the relationships between the data objects.

Data objects 418 are an example of a graphical representation of data objects on the canvas. Data objects on the canvas may be selected by clicking or otherwise selecting an object with an input device such as mouse or other pointing object. In an embodiment, selecting a graphical representation of a data object may cause the graphical representation of the data object and the relationship lines of the data object to be highlighted.

ID fields 419 are examples of a field that may be included in a data object, such as a data object for a job application. For example, one of ID fields 419 may be a field for identifying the job applicant. Data object menu 420, when selected, displays more information about the data object to the user, and provides the user with options for editing the data object (e.g., replacing information for one or more of a data object's records).

Expand/collapse object 422 may be an interface element, which when selected causes the graphical representation of a data object to expand and show all the fields of the corresponding data object or collapse and hide the fields of the corresponding data object (the corresponding data object is the data object represented by the graphical representation being expanded or collapsed).

Field type 424 describes the type of data associated with a field. User 426 displays the current logged in user. User 426 may be a pull down menu listing the options for the user, such as user profile, setup, system log, and logout options. Help 428, when selected, provides information to the user that is intended to be helpful in using schema builder, and help 428 may also provide additional helpful information related to the use of other features provided by server system 101. Legend 430 is an embodiment of a legend on the canvas. Legend 430 shows coloring and symbols that are used to represent lookup relationships, master-detail relationships, and required fields of data objects in the graphical representation of the schema. Master-detail relationship and lookup relationships may be indicated by lines of different colors to differentiate the line representing the master-detail relationships from the line representing a look-up relationship. Zoom in 432, when selected, zooms in on the data objects on the canvas, showing less of the area that may be selected for viewing, via the canvas, but the portion of the canvas that is currently selected for viewing remains visible and is enlarged, and more details may be visible in the enlarged view. Zoom out button 433, when selected, zooms out the data objects in the canvas, which may show more data objects, reduced in size and possibly with less detail. Map 434 is a portion of the canvas showing current viewing scope of the canvas. Map 434 shows the entire view of the schema selected, but reduced in size. Map 434 may indicate the part of the map that is currently being shown on the canvas. Selecting a portion of map 434 may cause that portion of the schema to appear on the canvas. Field 436 displays the fields in data objects. Lookup relationship 438 represents the lookup relationships that exist among data objects. Lookup relationship 438 is indicated by a dotted line and described in the legend on the canvas. Required fields 440 is shown as a red line next to fields which are required fields that must be included in the data objects when creating the data objects. Navigation window 441 is the left side menu in the schema builder example 400 with a menu for selection of data objects to view in the canvas. A user may select data objects to be viewed on the canvas by checking a check box next to the data object. Clear 442, when selected, clears the selection of data objects for viewing on the canvas. Select 444, when selected, selects all the data objects from the data object type, and displays the selection on the canvas. Unselected data object 446 may be one or more data objects that are not selected for displaying on the canvas. Unselected data objects 446 may have check boxes without checks indicating that the object associated with the check box is unselected. Selected data object 448 may be one or more data objects that are selected for display on the canvas. Selected data objects 448 may have check boxes with checks indicating that the object associated with the check box is selected, and the absence of checks in the check boxes may be used to indicate that the object associated with the check box is not selected.

Quick find 452 is an input box for finding data objects available for viewing on the canvas. Entering characters contained in the names or labels of data objects may cause those data objects to be listed in navigation window 441. Selecting a type of data object, via object selection 454, may change the data objects visible to the user, which may change the layout computed by the auto layout feature. Selection 454 may be a pull down menu with a selection of the type of data objects, such as all data objects, selected data objects, standard data objects, custom data objects, and system data objects. Data objects from the selected data object type may appear on a side window for selection for viewing on the canvas.

Schema elements 456, when selected, allows the user to drag and drop schema elements, such as data object and relationships into the schema. Objects 458, when selected, allows the user to choose the data objects that are viewable on the on the canvas. In an embodiment, schema 456 and objects 458 may be two tabs, and the user may choose which of the two tabs to select. In an embodiment, the user cannot select both schema 456 and objects 458 simultaneously. In FIG. 4, objects 458 is selected, and schema elements 456 is not selected. Consequently, in the view of FIG. 4, the user can choose the objects to view, but not add or modify new elements.

Although find 402, previous button 404, next button 406, auto-layout button 408, schema builder 410, view options 412, canvas 415, ID fields 419, navigation window 441, data objects 418, data object menu 420, expand/collapse object 422, field type 424, user 426, help 428, zoom-in 432, zoom-out 433, map 434, field 436, lookup relationship 438, required fields 440, objects 458, and schema elements 456 appear in the screenshots of each of FIG. 4, FIG. 5, FIG. 6, FIG. 9, FIG. 10, FIG. 11, FIG. 13, FIG. 14, FIG. 15, FIG. 16, FIG. 17, FIG. 18, FIG. 21, and FIG. 22, since the description of find 402, previous button 404, next button 406, auto-layout button 408, schema builder 410, view options 412, canvas 415, ID fields 419, navigation window 441, data objects 418, data object menu 420, 422, field type 424, user 426, help 428, zoom-in 432, zoom-out 433, map 434, field 436, lookup relationship 438, required fields 440, schema elements 456, and objects 458 were discussed above, that description will not be repeated in FIG. 5, FIG. 6, FIG. 9, FIG. 10, FIG. 11, FIG. 13, FIG. 14, FIG. 15, FIG. 16, FIG. 17, FIG. 18, FIG. 21, and FIG. 22.

Figure 5:
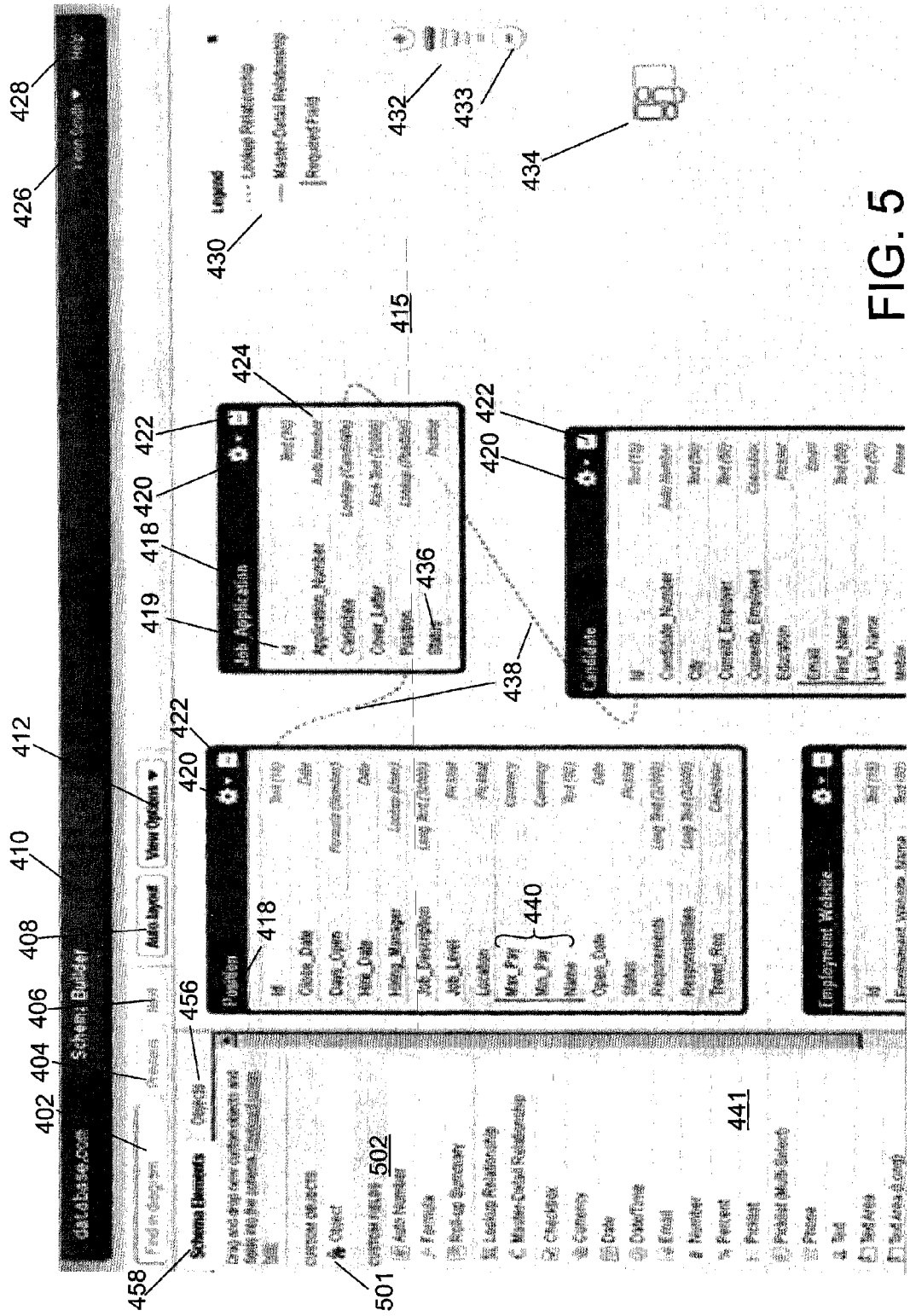
FIG. 5 is a screenshot of an embodiment of an online tool displaying a schema, relationships of objects within the schema, and the contents of certain tabs within the tool.

Legend 430 appears in the screenshots of each of FIG. 4, and FIG. 5 and since the description of find legend 430 was discussed above, that description will not be repeated in FIG. 5.

Figure 6:
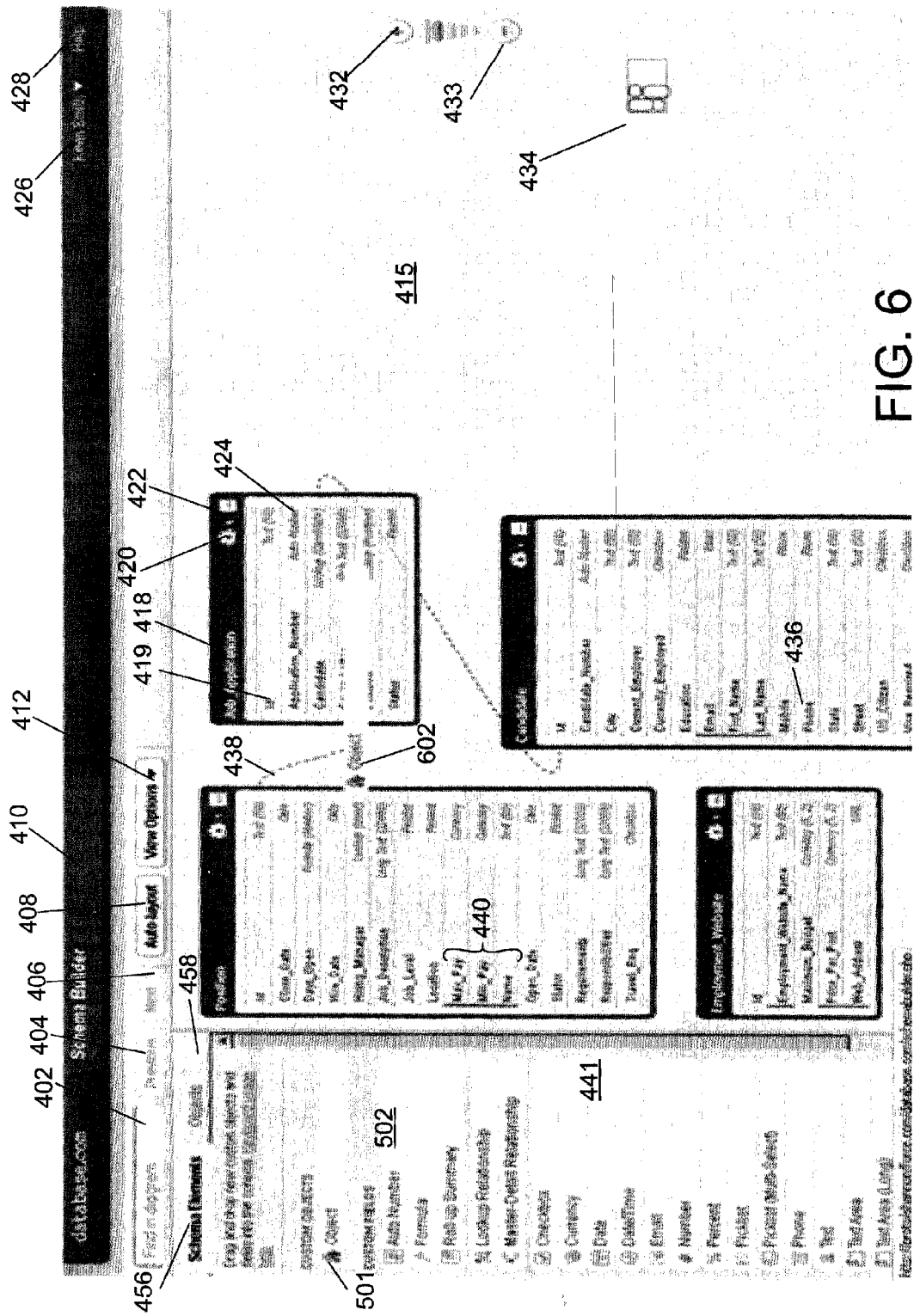
FIG. 6 is a screenshot illustrating an embodiment of the addition of a new object to an existing schema.
Figure 7:
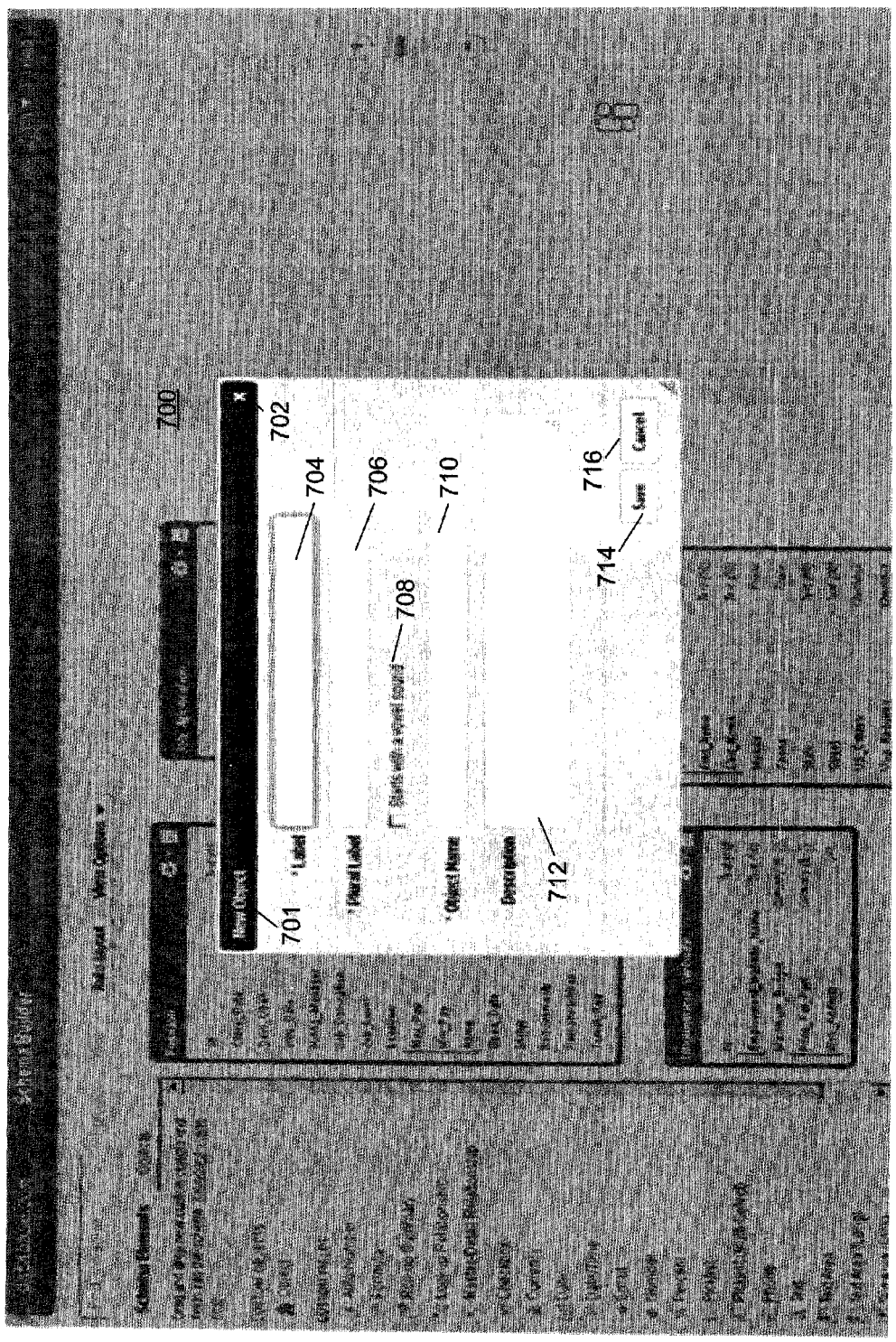
FIG. 7 is a screenshot illustrating an embodiment of a dialogue box presented to a user adding a new object to a schema.

FIG. 5 is a screenshot of an embodiment schema builder with add objects 500, displaying a schema and relationships of add objects within the schema. FIG. 5 FIG. 6 and FIG. 7 show screenshots of the steps performed when adding a data object to the schema builder. Schema builder with custom objects 500 may include find 402, previous button 404, next button 406, auto-layout button 408, schema builder 410, view options 412, options 414, canvas 415, ID fields 419, navigation window 441, data objects 418, data object menu 420, expand/collapse object 422, field type 424, user 426, help 428, legend 430, zoom 432, map 434, field 436, lookup relationship 438, required fields 440, clear 442, select 444, unselected data object 446, selected data object 448, quick find 452, selection 454, schema elements 456, objects 458, custom object 501, and custom fields 502. In other embodiments, scheme builder with custom objects 500 may not have all of the elements listed and/or may have other elements instead of or in addition to those listed.

In FIG. 5, the tab for objects 458 is not selected, and the tab for schema elements 456 is selected. Consequently, in the view of FIG. 5, the user cannot choose the objects to view, but can add or modify elements of the schema. Schema builder with add objects 500 shows a screenshot in which the user selected a custom object to add to the schema. Custom object 501 is the schema element that the user chose to add to the schema. Schema builder with add objects 500 shows the custom object named being selected. Custom fields 502, lists types of fields that the user may choose to add to a data object.

For example, the user may be offered a choice of whether to add a field that includes an automatically chosen number, a value determined by a formula, a value of a lookup relationship, a value of a master detail relationship, a checkbox, a monetary quantity having a particular currency, a date, the combination of a date and time, an email address, a picklist that allows only one selected value, a picklist that allows multiple selected values, a numerical value, a value expressed as a percentage, a phone number, a text value, a text box in which the user can enter text, a long text box (e.g., for entering a description). In other embodiments, not all of these types of fields may be available for the user to choose form and/or there may be other types of fields that the user may be able to choose from in addition to and/or instead of those in FIG. 5.

FIG. 6 is a screenshot of an embodiment of a webpage 600 in which a schema element is being dragged and dropped. Webpage 600 may include find 402, previous button 404, next button 406, auto-layout button 408, schema builder 410, view options 412, options 414, canvas 415, ID fields 419, navigation window 441, data objects 418, data object menu 420, expand/collapse object 422, field type 424, user 426, help 428, legend 430, zoom 432, map 434, field 436, lookup relationship 438, required fields 440, clear 442, select 444, unselected data object 446, selected data object 448, quick find 452, selection 454, schema elements 456, objects 458, custom object 501, custom fields 502, and drag and drop object 602. In other embodiments, webpage 600 may not have all of the elements listed and/or may have other elements instead of or in addition to those listed.

Webpage 600 shows the steps in adding a data object by dragging and dropping the data object from the navigation window 441 into canvas 415. Drag and drop object 602 is object the selected custom object 501 being dragged and dropped into canvas 415 to add a custom data object to the schema. Adding a data object may result in a dialogue box/prompt window to appear, which prompts a user to define aspects of the data object, which may result in a schema builder appearing similar to the screenshot of FIG. 7.

FIG. 7 is a screenshot of an embodiment of define aspects 700. Define aspects 700 may include title 701, close 702, label 704, plural label 706, vowel sound 708, object 710, description 712, save 714 and cancel 716. In other embodiments, define aspects 700 may not have all of the elements listed and/or may have other elements instead of or in addition to those listed.

Define aspects 700 may result from dragging and dropping a data object from the navigation window to the canvas in order to add a data object to the schema. Define aspects 700 prompts the user to enter various defining characteristics of the schema element being created. Define aspects 700 may include various fields for the user to enter information about the schema element. In an embodiment, define aspects 700 may include a value for the label name and description of the data object in order to complete the operation of adding a new data object. Title 701 is the title of the dialogue box/prompt window, which describes the type of schema element that is being defined, which in this example is a data object. Selection of close 702 closes the dialogue box/prompt window. Label 704 is an input box for entering a label for the data object being added. Plural label 706 is an input box for entering a plural label. The plural label appears on the tab for accessing the data object. Vowel sound 708 is a check box for setting the preceding word with 'an' or 'a' for the label. In an embodiment, vowel box 708 may be replaced with a check box or filed to indicate preceding article or other word. Object 710 is an input box for entering the name of the data object being added. In an embodiment, and indicator, such as a red asterisk (or another symbol), appears next to required fields, which in this example are label 704, plural labels 706, and object 701. Other embodiments may have other required fields. Description 712 is an input box for entering a brief description of the data object. The description helps in understanding the differences between data objects when viewing a list of data objects and/or when viewing the schema on canvas 415. Selection of save 714 saves the aspects of the data object and closes the dialogue box/prompt window. Cancel 716, when selected, cancels the defining operation and closes the dialogue box/prompt window.

Figure 8:
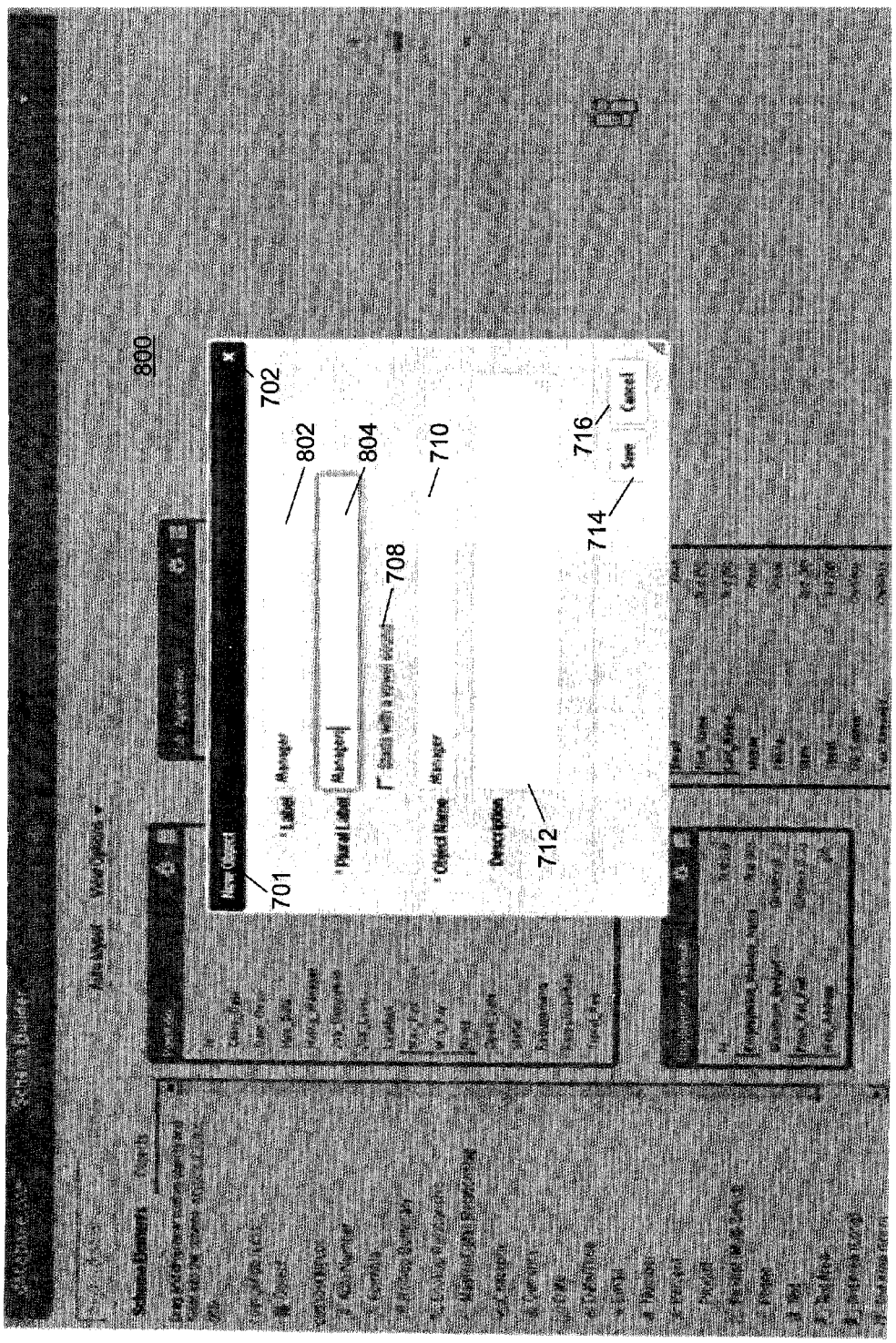
FIG. 8 is a screenshot illustrating an embodiment of content being entered into a dialogue box presented to a user adding a new object to a schema.

Although title 701, close 702, vowel sound 708, object 710, description 712, save 714 and cancel 716 appears in the screenshots of FIG. 7 and FIG. 8, title 701, close 702, vowel sound 708, object 710, description 712, save 714 and cancel 716 were discussed above, that description will not be repeated in FIG. 8.

FIG. 8 is a screenshot of an embodiment of define aspects 800. Define aspects 800 may include title 701, close 702, vowel sound 708, object 710, description 712, save 714, cancel 716, label 802 and plural label 804. In other embodiments, define aspects 800 may not have all of the elements listed and/or may have other elements instead of or in addition to those listed.

Label 802 displays the label entered by a user. Plural label 804 displays the plural label as entered by the user, which in this example is the plural form of the label entered in label 802.

Figure 9:
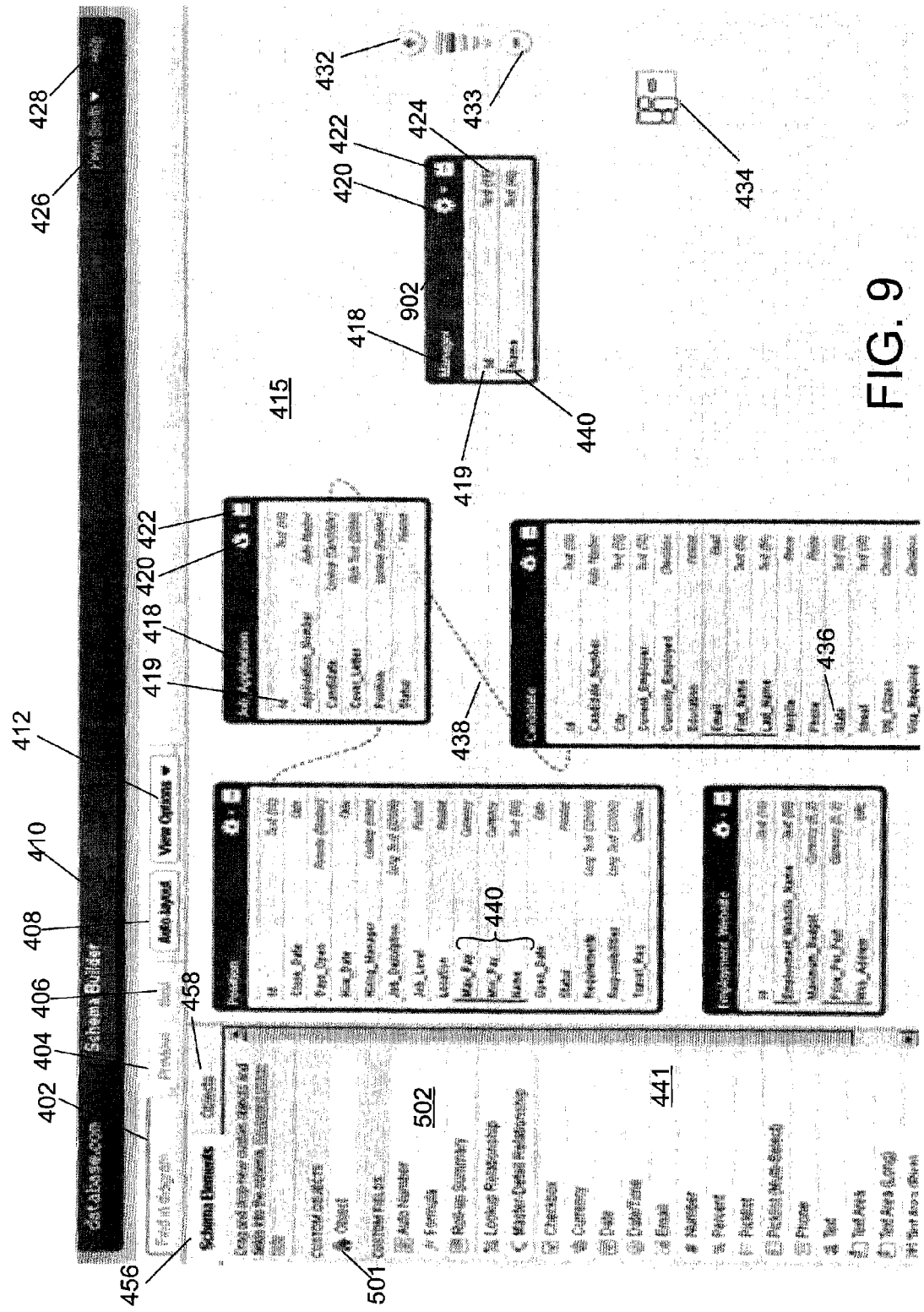
FIG. 9 is a screenshot illustrating an embodiment of the representation of a new object once it is added to a schema.

FIG. 9 is a screenshot of an embodiment of a webpage 900 having a new data object. Webpage 900 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, and new data object 902. In other embodiments, webpage 900 may not have all of the elements listed and/or may have other elements instead of or in addition to those listed.

Webpage 900 is a screenshot showing a new data object on the canvas which may be the result of defining aspects of the data object. New data object 902 is the newly created data object, which in this example is "Manager." In webpage 900, new data object 902 is highlighted indicating that new data object 902 is currently selected. Selected data objects may be dragged and dropped on the canvas to place the data object in a different location.

Figure 10:
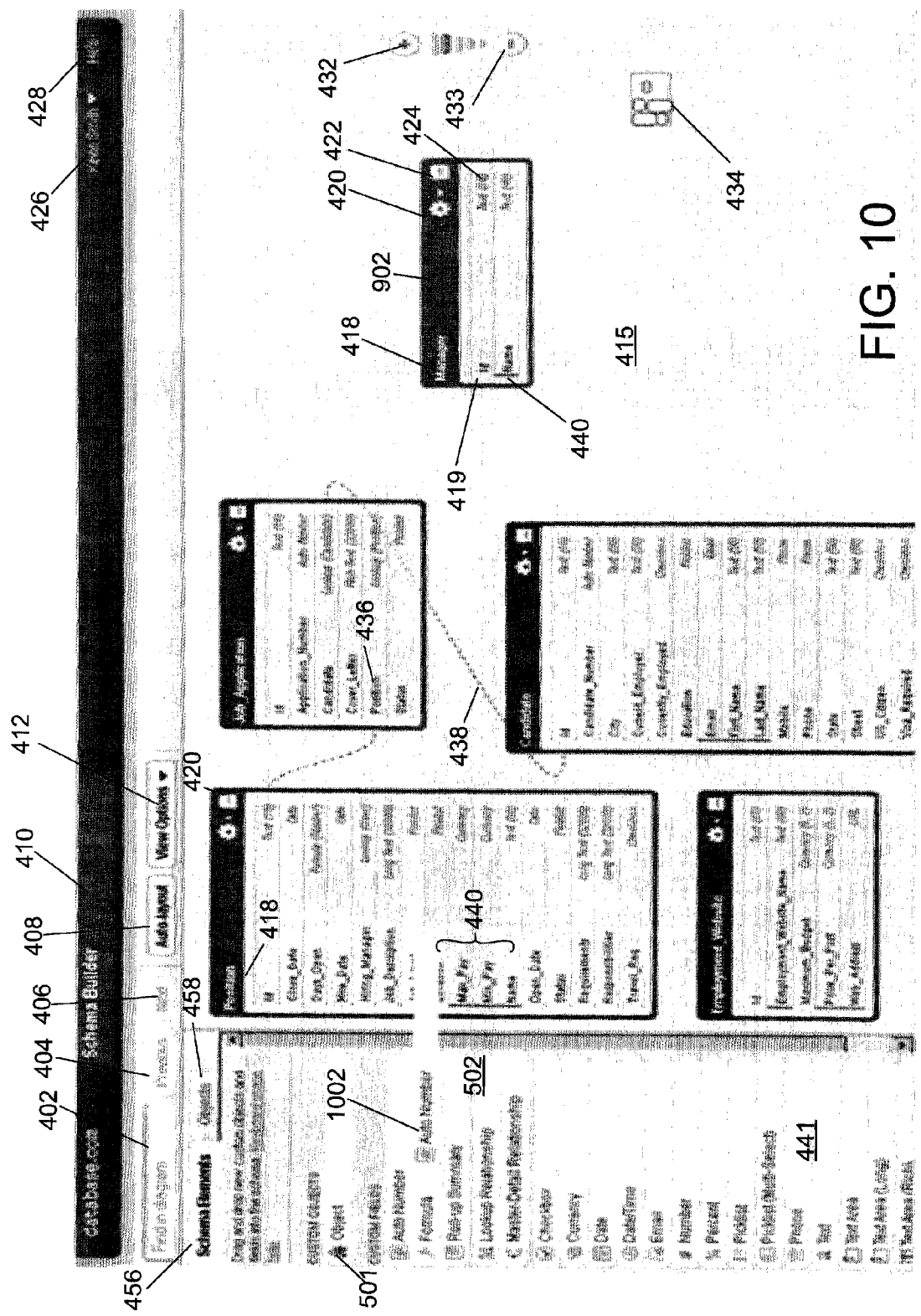
FIG. 10 is a screenshot illustrating an embodiment of the selection a custom field from a tab of the online tool.

FIG. 10 is a screenshot of an embodiment of add fields webpage 1000. Add fields webpage 1000 may include find 402, previous button 404, next button 406, auto-layout button 408, schema builder 410, view options 412, options 414, canvas 415, data objects 418, fields 419, data object menu 420, expand/collapse object 422, field type 424, user 426, help 428, legend 430, zoom 432, map 434, field 436, lookup relationship 438, required fields 440, ID navigation window 441, clear 442, select 444, unselected data object 446, selected data object 448, quick find 452, selection 454, objects 458, schema elements 456, custom object 501, custom fields 502, new data object 902 and select field 1002. In other embodiments, add fields webpage 1000 may not have all of the elements listed and/or may have other elements instead of or in addition to those listed.

Add fields webpage 1000 is a webpage showing the selection of a custom field and the initial dragging of the field from the menu of types of fields associated with field type 424. Dragging and dropping the selected field causes the selected field to be added to the data object on the canvas 415 onto which it was dropped. Field 1002 is the selected field being dragged.

Figure 11:
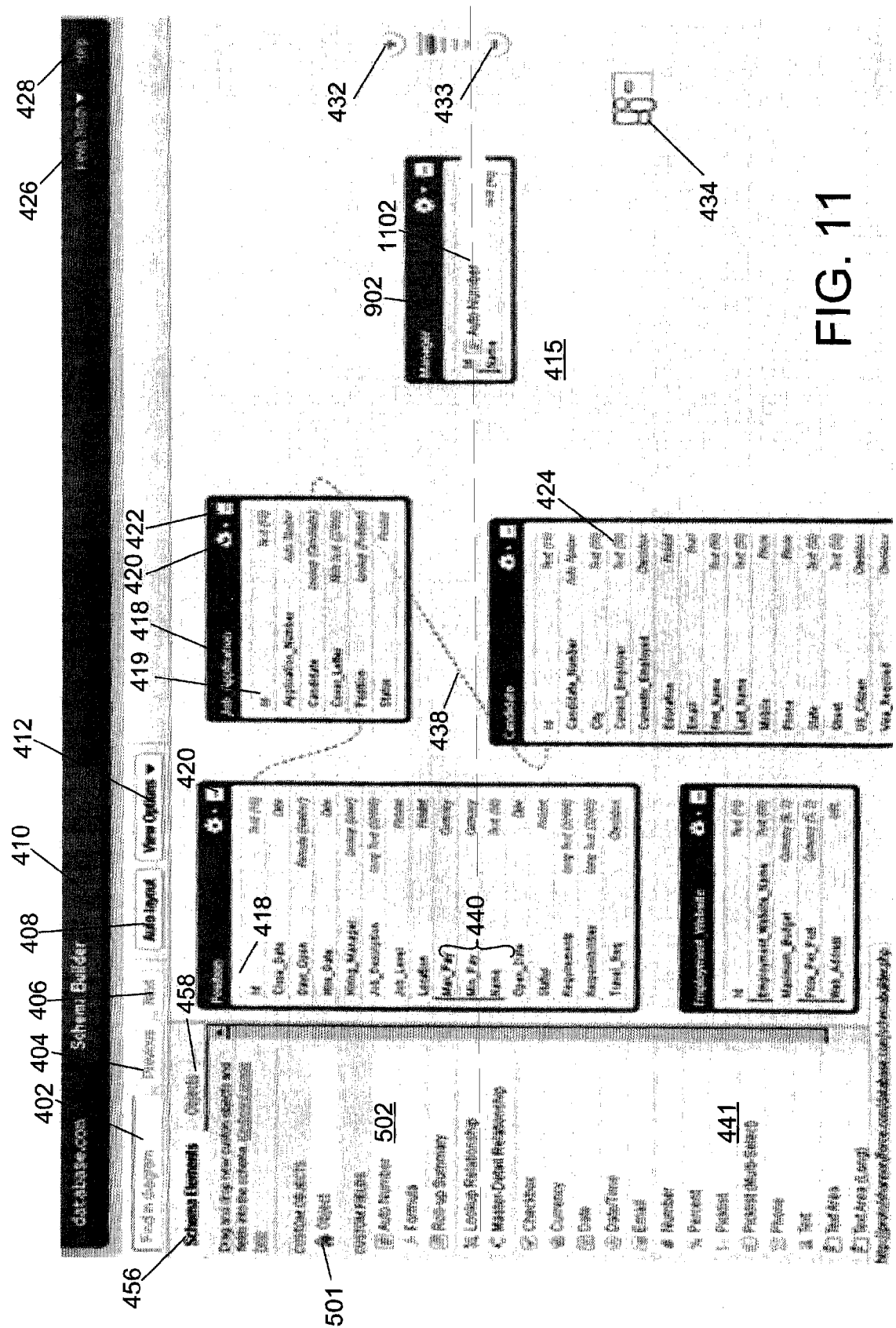
FIG. 11 is a screenshot illustrating an embodiment of the dragging and dropping of a custom field selected from a tab of the online tool onto a selected object of the schema.

FIG. 11 is a screenshot of an embodiment of add fields webpage 1100. Add fields webpage 1100 may include find 402, previous button 404, next button 406, auto-layout button 408, schema builder 410, view options 412, options 414, canvas 415, ID, data objects 418, fields 419, data object menu 420, 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902 and select field webpage 1102. In other embodiments, add fields 1100 may not have all of the elements listed and/or may have other elements instead of or in addition to those listed.

Add fields webpage 1100 is a screenshot showing the dropping of a selected custom field to add to a selected data object on canvas 415. Field 1102 is the selected field being dropped into data object 902. Data object 902 is highlighted indicating that data object 902 is selected and that data object 902 may be ready to be modified.

Figure 12:
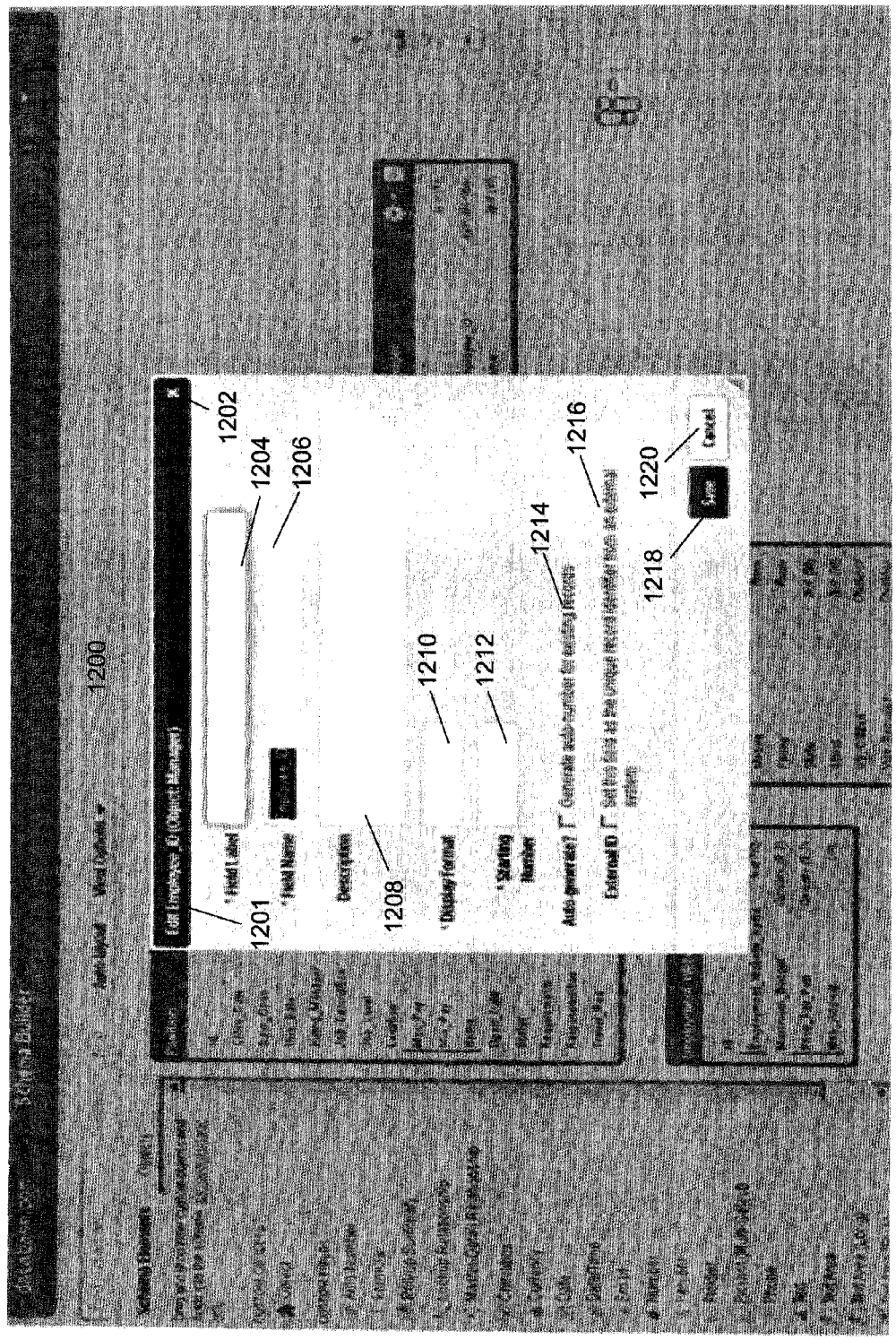
FIG. 12 is a screenshot illustrating an embodiment of a dialogue box presented to a user when a field is added to a data object.

FIG. 12 is a screenshot of an embodiment Edit field box 1200. Edit field box 1200 may include title 1201, close 1202, field label 1204, field name 1206, description 1208, display format 1210, starting number 1212, auto-generate 1214, external id 1216, save 1218 and cancel 1220. In other embodiments, edit field box 1200 may not have all of the elements listed and/or may have other elements instead of or in addition to those listed.

Edit field box 1200 is a dialogue box for adding a field to a data object. Title 1201 is the title of the dialogue box displaying the type of field being edited and name of the data object to which the field is being added, which is the object into which the field was dropped. Close 1202, when selected, closes the dialogue box. Field label 1204 is an input box for entering the label that will appear in the graphical element representing the data object, identifying the field that was added. Field name 1206 is name of the field in the actual object being created or modified. In the example of FIG. 12, edit field 1200 shows that the text "Employee_ID" was entered as the field name. In an embodiment, a default field name may be chosen based on the field type. Description 1208 is an input box for describing the field. Display format 1210 is an input box for entering the display format for field names. For example curly braces may be used to indicate the format for entering a date such as {MM}, {DD}, {YY}. Starting number 1212 is an input box for entering the starting number of the auto-number (i.e., automatically incrementing number) for the data field in the custom data object. Starting number may be the first number assigned to the first record. Auto-generate 1214 is a check box, which when checked automatically fills in the number for the record. External id 1216 is a check box for indicating that the record contains unique record identifiers from a system outside system 100. When external id 1216 is checked, an import wizard will detect existing records in system 100 that have the same ID as external ID 1216. Save 1218, when selected, saves the inputs in edit field box 1200, and closes the window. Cancel 1220, when selected closes the window without saving the inputs.

Figure 13:
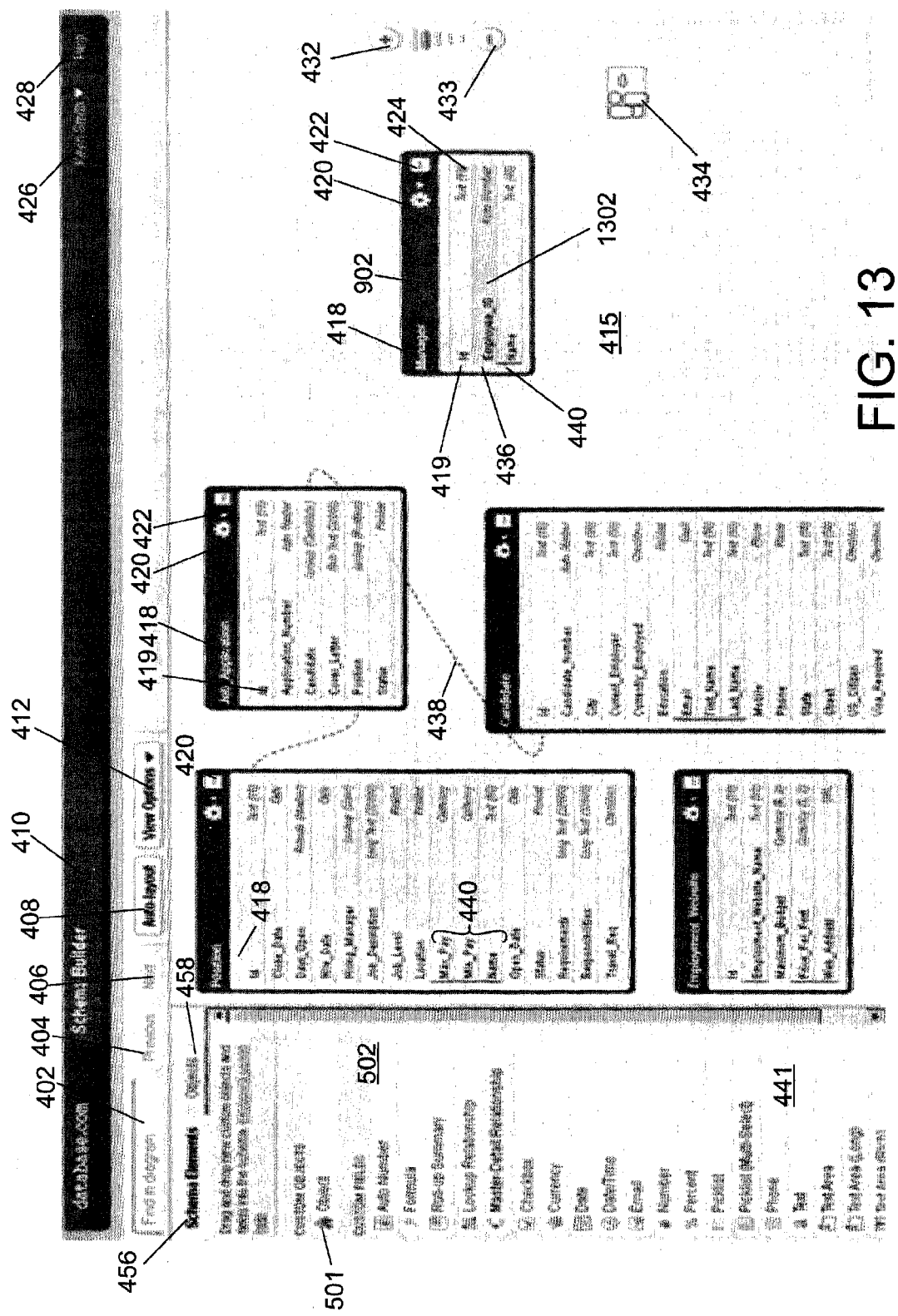
FIG. 13 is a screenshot illustrating an embodiment of the representation of a data object in a schema with a newly added field.

FIG. 13 is a screenshot of an embodiment of edit fields webpage 1300. Edit fields webpage 1300 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, data object 902 and edited field 1302. In other embodiments, edit fields webpage 1300 may not have all of the elements listed and/or may have other elements instead of or in addition to those listed.

Edit fields webpage 1300 is a webpage showing the edited fields in data object 902 on canvas 415. Edited field 1302 is the field that was edited in data object 902. Data object 902 is highlighted indicating that data object 902 is selected.

Figure 14:
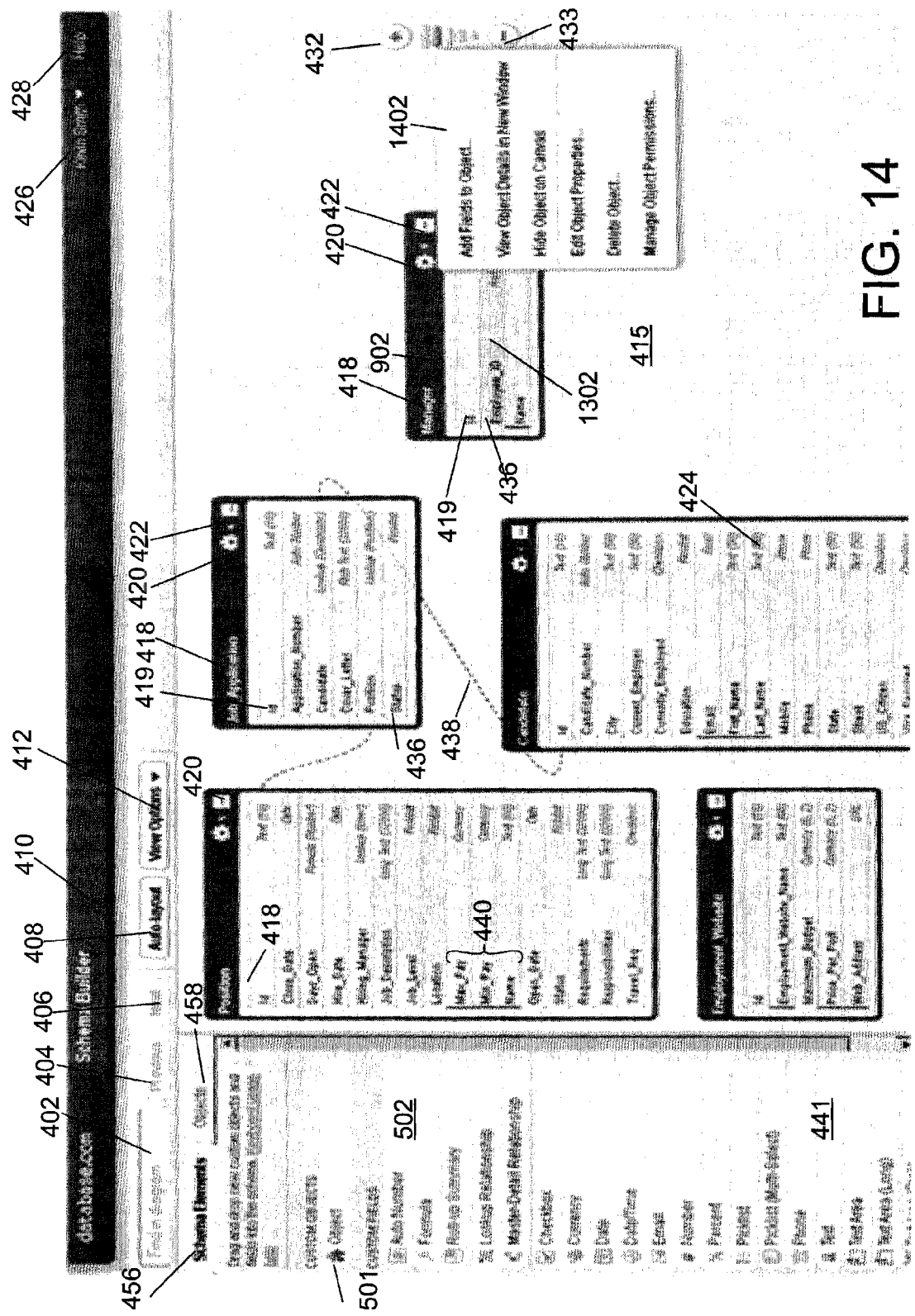
FIG. 14 is a screenshot illustrating an embodiment of the dropdown menu of actions available on a data object.

FIG. 14 is a screenshot of an embodiment of show options webpage 1400. Show options webpage 1400 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902 and options 1402. In other embodiments, show options webpage 1500 may not have all of the elements listed and/or may have other elements instead of or in addition to those listed.

Show options webpage 1400 is a webpage showing the edited fields in the schema builder, with a menu of options open. Options 1402 displays a menu listing the operations that maybe performed on the selected data object. Selection of a data object and receiving a particular input from a pointing device (e.g., a right click on a mouse) cause the display of options 1402.

Figure 15:
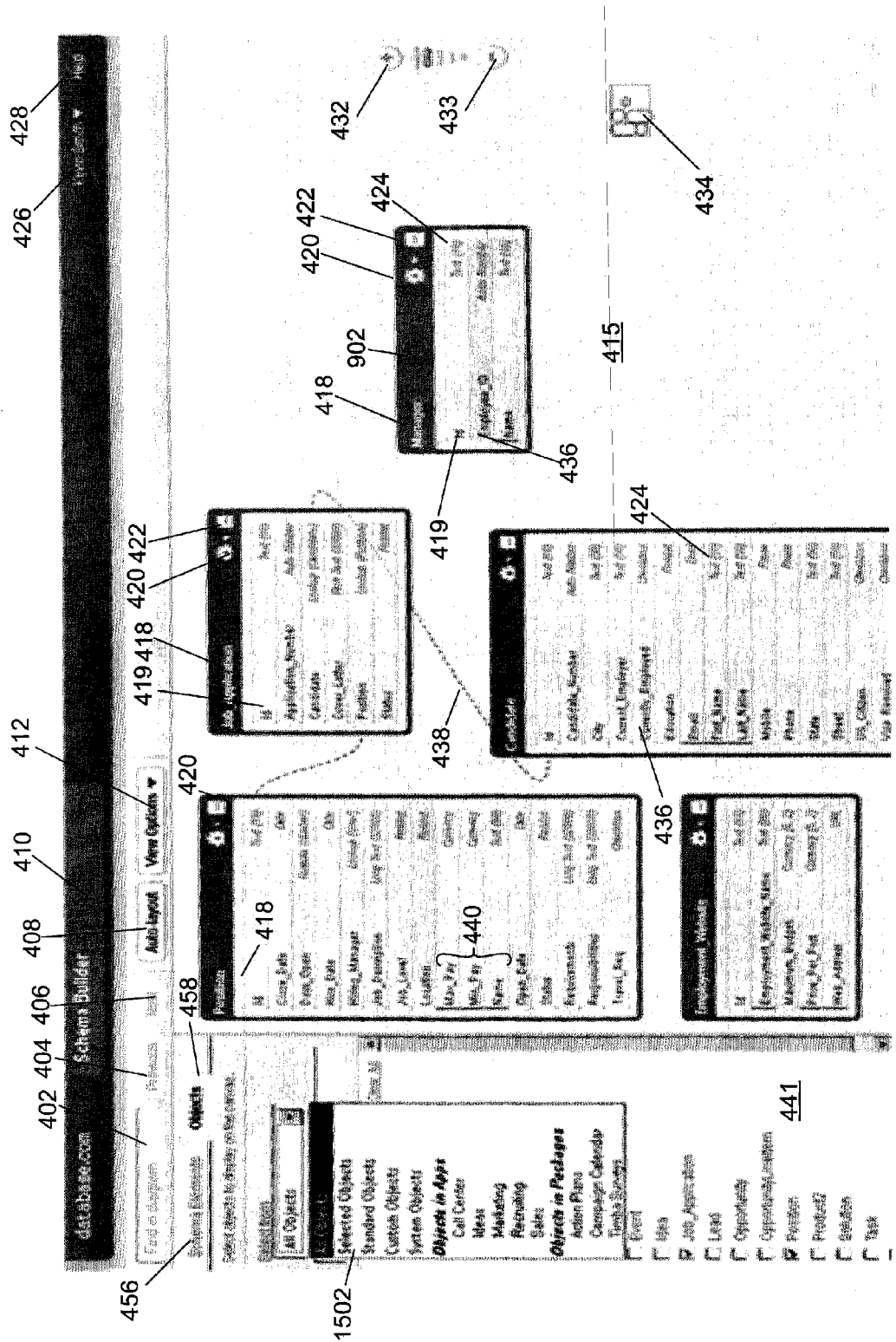
FIG. 15 is a screenshot illustrating an embodiment of object level display options.

FIG. 15 is a screenshot of an embodiment of select object webpage 1500. Select object webpage 1500 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902 and select objects 1502. In other embodiments, select object webpage 1500 may not have all of the elements listed and/or may have other elements instead of or in addition to those listed.

Select object webpage 1500 is a webpage showing the data object types in navigation window 441 of the schema builder, which the user may choose for viewing. Select objects 1502 lists the different object types for display on the canvas of the schema builder. After the user selects one or more types of data objects, only those data objects will appear on canvas 415. For example, using selected objects 1502, the user may choose to view all objects, selected objects, only standard objects, custom objects, system objects, objects in a particular application, and/or objects in particular packages. Selected objects 1502 may include a list of available applications and/or packages from which the user may choose. If the user only chooses selected objects, the schema builder may show only those objects that are selected (selected data objects 448) on canvas 415. In the example of FIG. 15, the user selected all objects. The effects of selecting objects takes effect after selected objects 1502 is closed.

Figure 16:
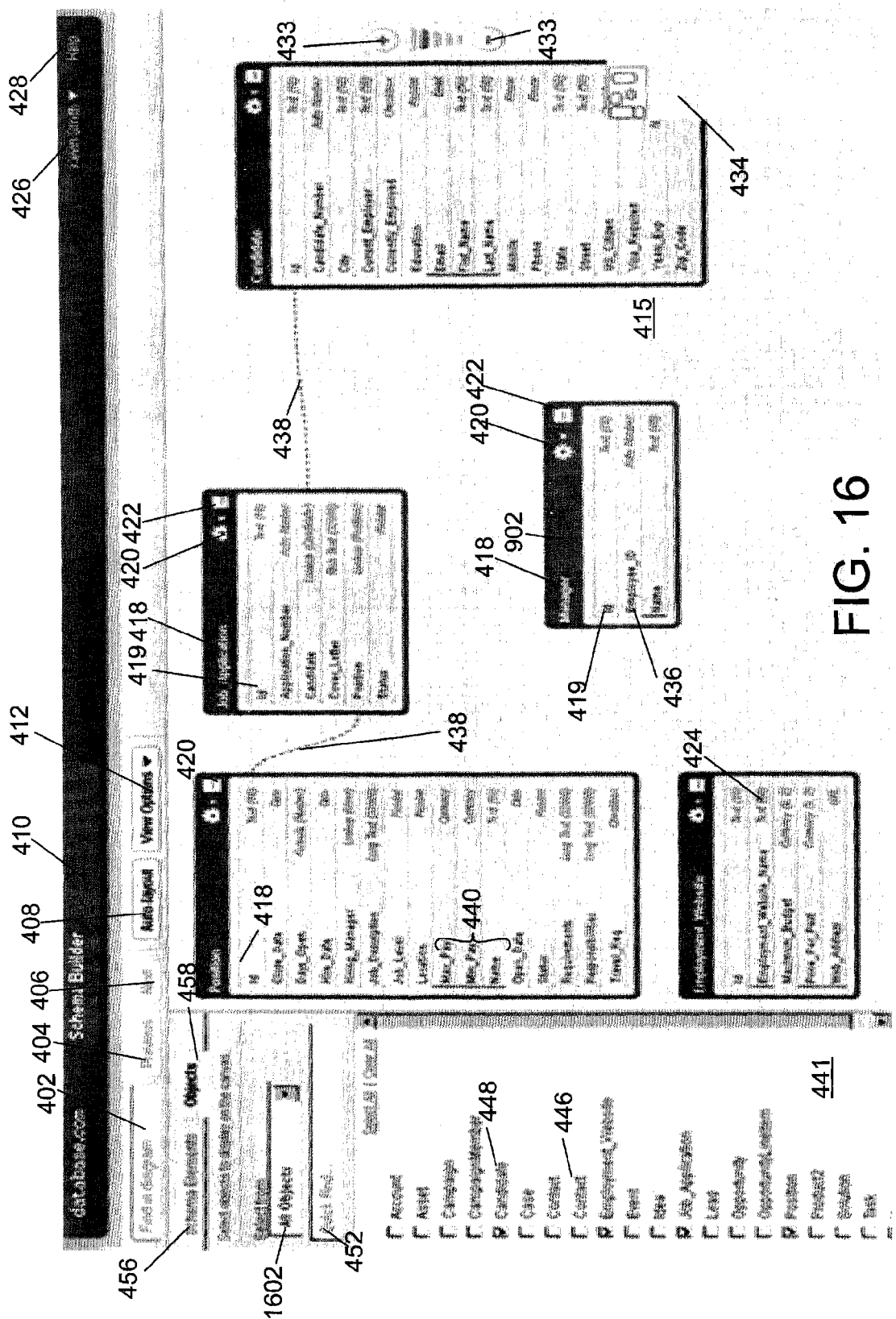
FIG. 16 is a screenshot illustrating an embodiment of alternative display arrangement of objects.

FIG. 16 is a screenshot of an embodiment of all objects webpage 1600. All objects webpage 1600 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902 and all objects webpage 1602. In other embodiments, all objects webpage 1600 may not have all of the elements listed and/or may have other elements instead of or in addition to those listed.

All objects webpage 1600 is a webpage showing the selection of all objects types in the schema builder. All objects webpage 1600 shows the result of selecting all objects in the menu in selected objects 1502. The location of the graphical representation of the objects on the canvas 415 have been automatically changed to accommodate the objects that were not previous visible in the schema, but that are now visible.

Figure 17:
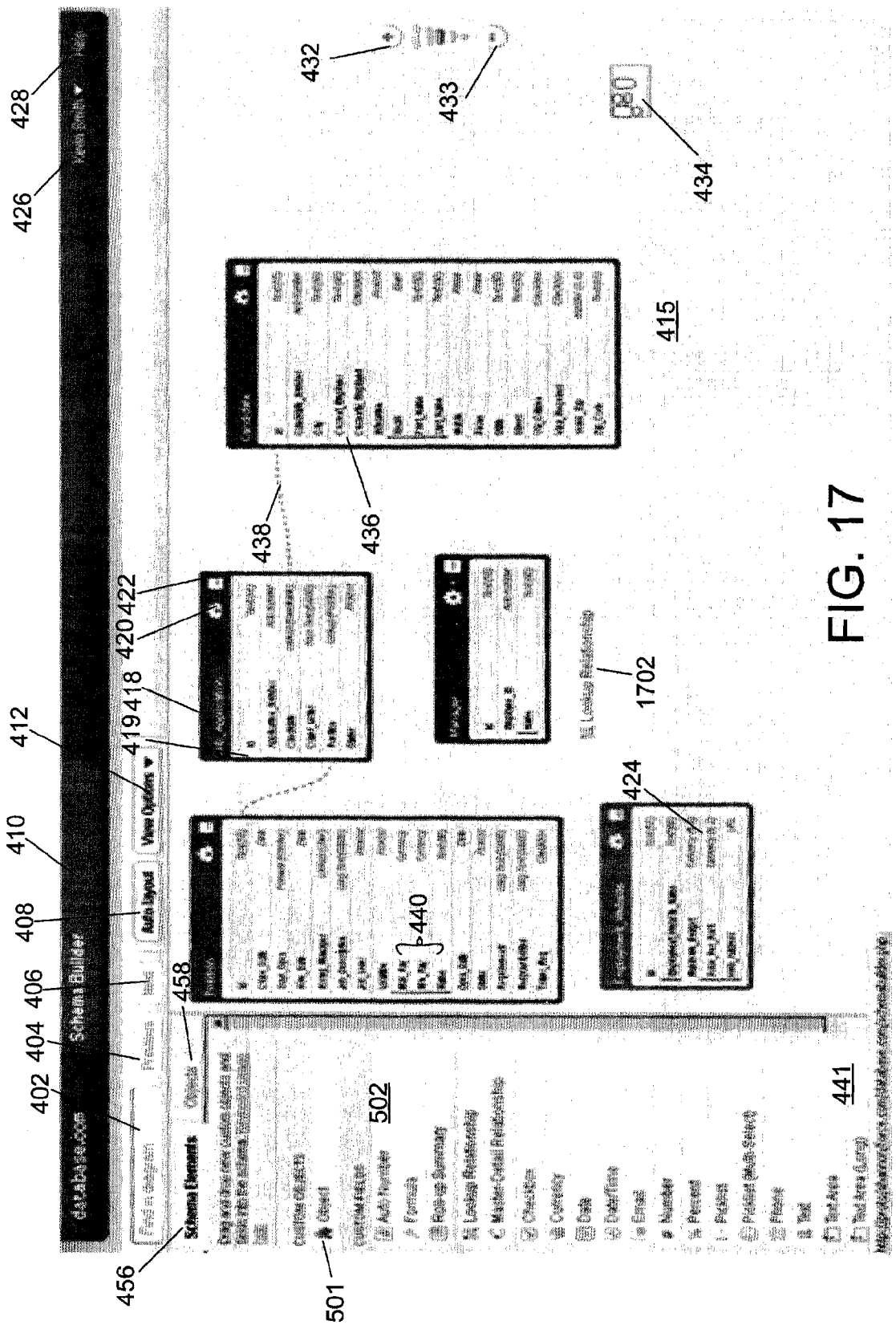
FIG. 17 is a screenshot illustrating an embodiment of the defining of relationships between objects in the schema.

FIG. 17 is a screenshot of an embodiment of a drag webpage 1700. Drag webpage 1700 may include find 402, previous button 404, next button 406, auto-layout button 408, schema builder 410, view options 412, options 414, canvas 415, data objects 418, fields 419, data object menu 420, expand/collapse object 422, field type 424, user 426, help 428, legend 430, zoom 432, map 434, field 436, lookup relationship 438, required fields 440, ID navigation window 441, clear 442, select 444, unselected data object 446, selected data object 448, quick find 452, selection 454, schema elements 456, objects 458, custom object 501, custom fields 502, new data object 902 and lookup relationship 1702. In other embodiments, drag webpage 1700 may not have all of the elements listed and/or may have other elements instead of or in addition to those listed.

Drag webpage 1700 is another webpage showing the drag and drop feature in the schema builder in which a relationship is dragged and dropped, which will establish a relationship between two data objects. Lookup relationship 1702 has been dragged from custom fields 502 into canvas 415 to be added to a data object in the schema builder. Lookup relationship 1702 is just one example of a relationship that may be dragged and dropped in the schema.

Figure 18:
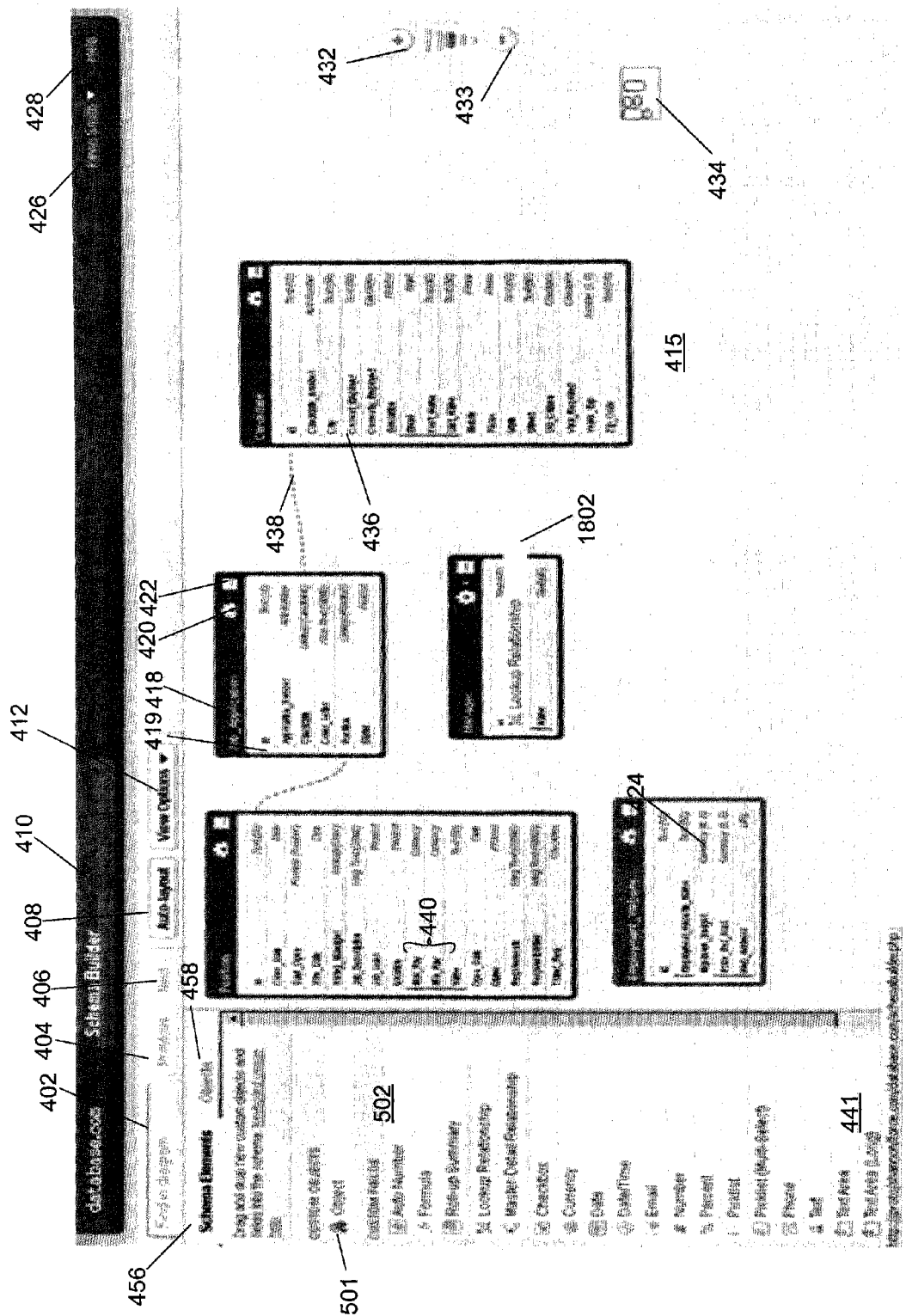
FIG. 18 is a screenshot illustrating an embodiment of the dragging and dropping of a relationship type onto a selected object of the schema.

FIG. 18 is a screenshot of an embodiment of drop webpage 1800. Drop webpage 1800 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902 and lookup relationship 1802. In other embodiments, drop webpage 1800 1800 may not have all of the elements listed and/or may have other elements instead of or in addition to those listed.

Drop webpage 1800 is a webpage in which a relationship is dropped onto the schema builder. Lookup relationship 1802 is the relationship of relationship 1702 which has been dropped and which was dragged from custom fields 502 (as shown in FIG. 17) and dropped into the graphical representation of object "manager". Dropping a data field lookup relationship into the graphical representation of object "manager" adds a lookup field to data object "manager" in the schema builder. After a lookup field has been added to a data object, a user may establish a relationship between the "manager object" and another object.

Figure 19:
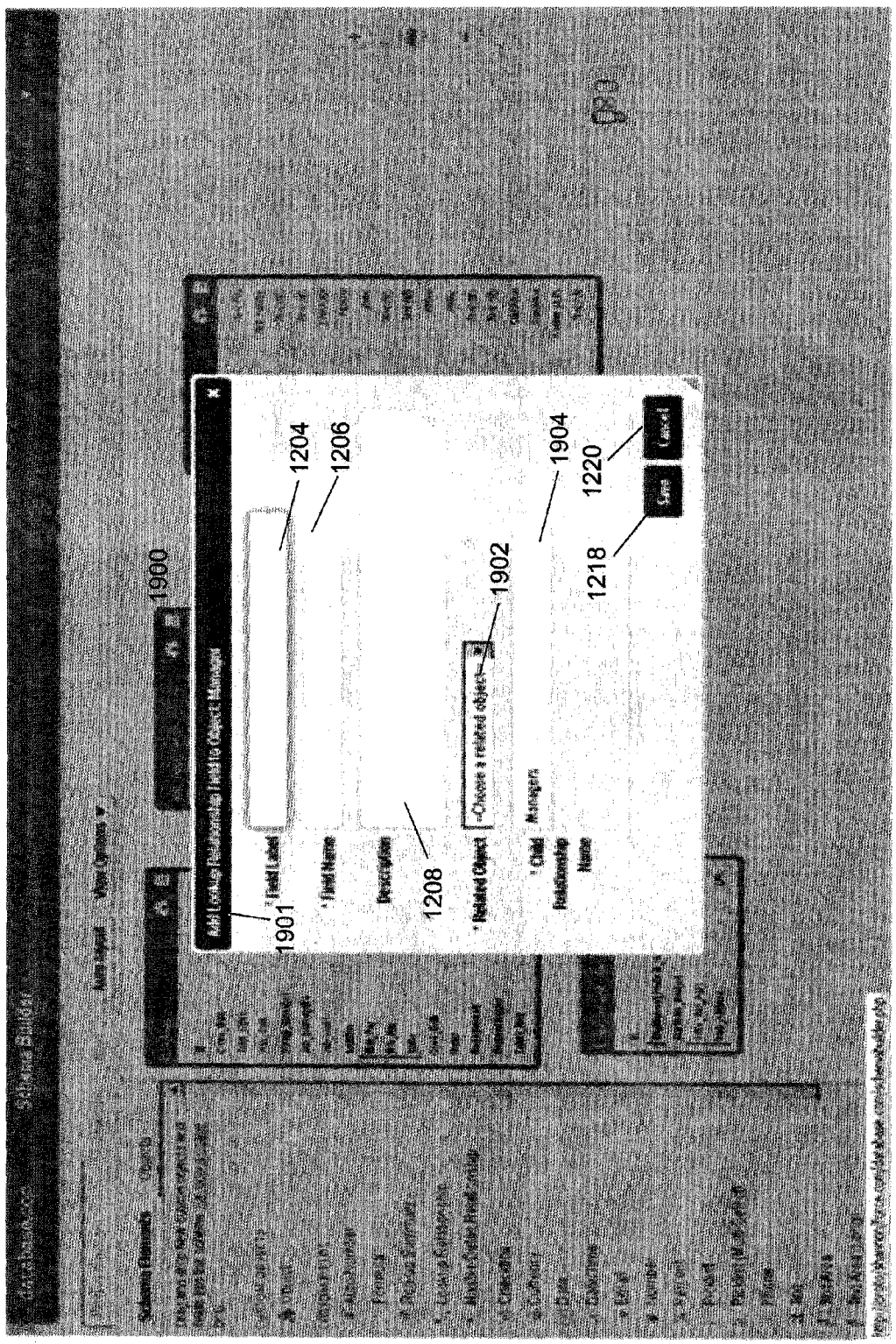
FIG. 19 is a screenshot illustrating an embodiment of a dialogue box presented to a user when a relationship type is assigned to a data object of the schema.

FIG. 19 is a screenshot of an embodiment define data object 1900. Define data object 1900 may include field label 1204, filed name 1206, description 1208, save 1218, cancel 1220, title 1901, related object 1902, and child 1904. In other embodiments, define data object 1900 may not have all of the elements listed and/or may have other elements instead of or in addition to those listed.

Title 1901 displays a title of the dialogue box for the defining the details of the relationship, which also defines a field in the data object, because adding the relationship adds a field to the current data object. Title 1901 also displays the name of the data object to which the field is being added to. Related object 1902 is a pull down menu that may be used to select the object to which the current object (e.g., manager) will be related. Child 1904 is the name of the child relationship of the data object.

Figure 20:
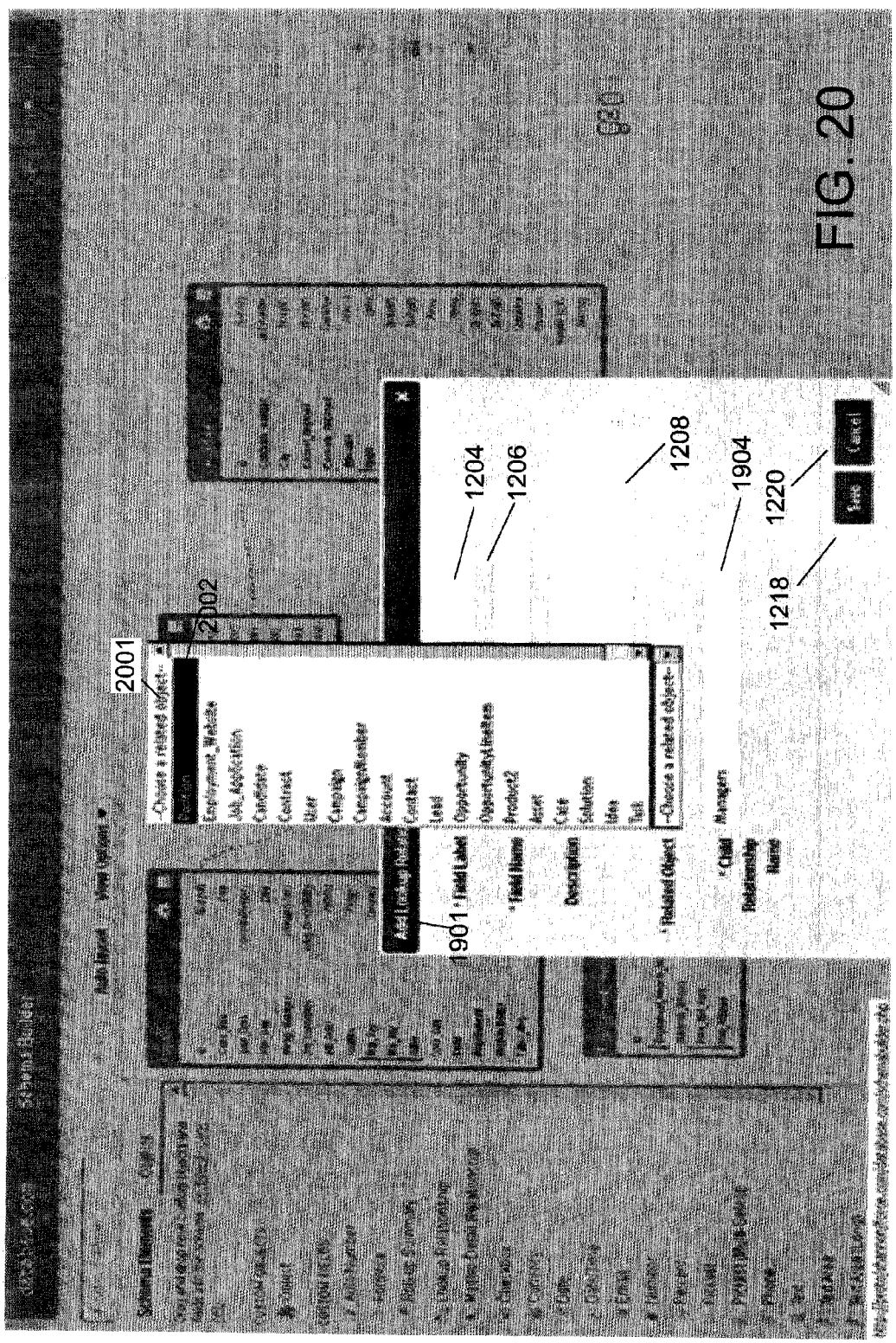
FIG. 20 is a screenshot illustrating an embodiment of a drop down menu listing objects available as a related object.

FIG. 20 is a screenshot of an embodiment of add related object 2000. Add related object 2000 is screenshot of a webpage, which may include field label 1204, filed name 1206, description 1208, save 1218, cancel 1220, title 1901, child 1904, related object menu 2001, and select related object 2002. In other embodiments, add related object 2000 may not have all of the elements listed and/or may have other elements instead of or in addition to those listed.

Related object menu 2001 is a menu that may be used for selecting an object to relate to the current object via the current relationship. Select related object 2002 is a selection from the pull down menu of related objects. In the example of FIG. 20, selected related object 2002 is data object "position." Selecting data object "position" relates the object "manager" to the object "position." Since "manager" is designated as the data child and "position" is designated as the master data object, information from the data object "position" is used to fill in fields and define details of data object "manager."

Figure 21:
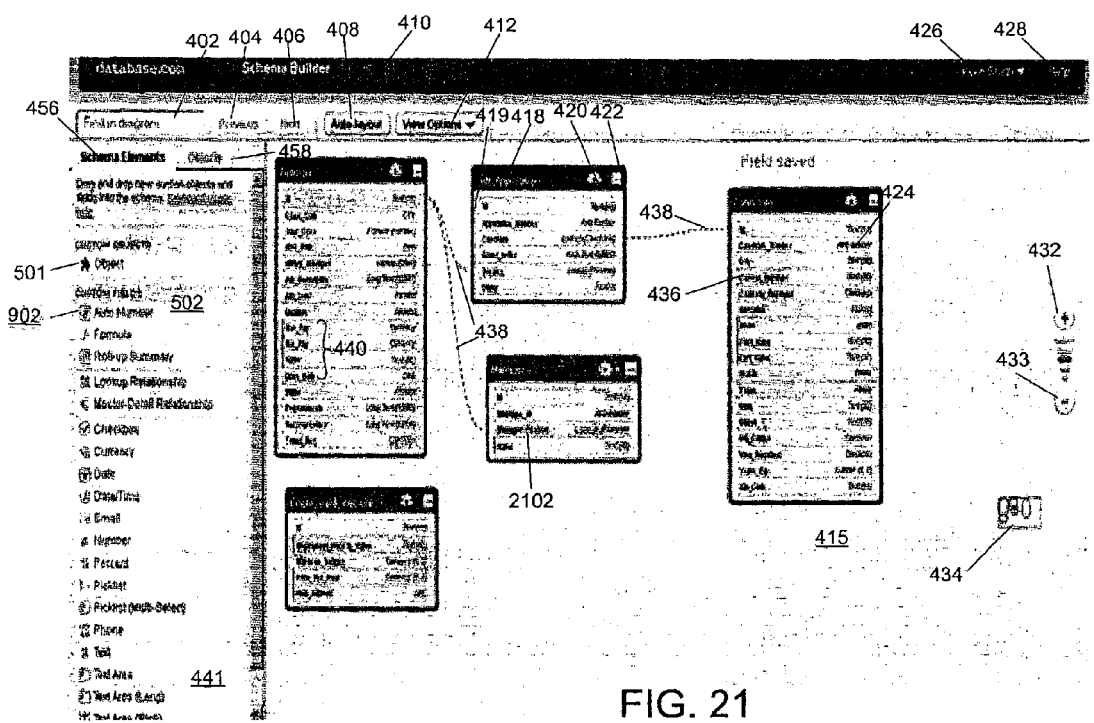
FIG. 21 is a screenshot illustrating an embodiment of a graphical representation of a relationship between two related objects.

FIG. 21 is a screenshot of an embodiment of added field webpage 2100. Added field webpage 2100 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902, and lookup relationship field 2102. In other embodiments, added fields webpage 2100 may not have all of the elements listed and/or may have other elements instead of or in addition to those listed.

Add field webpage 2100 is a webpage in which a field that was recently added is shown in a manner that distinguishes the recently added field from the other fields in the schema. Lookup relationship field 2102 is highlighted as a result of just being added to the data object "manager," via the steps shown in FIGS. 17-20. Also, to represent the new lookup relationship (which is lookup relationship 438), a new dashed line connecting the data objects "manager" and "position" now appears on canvas 415.

Figure 22:
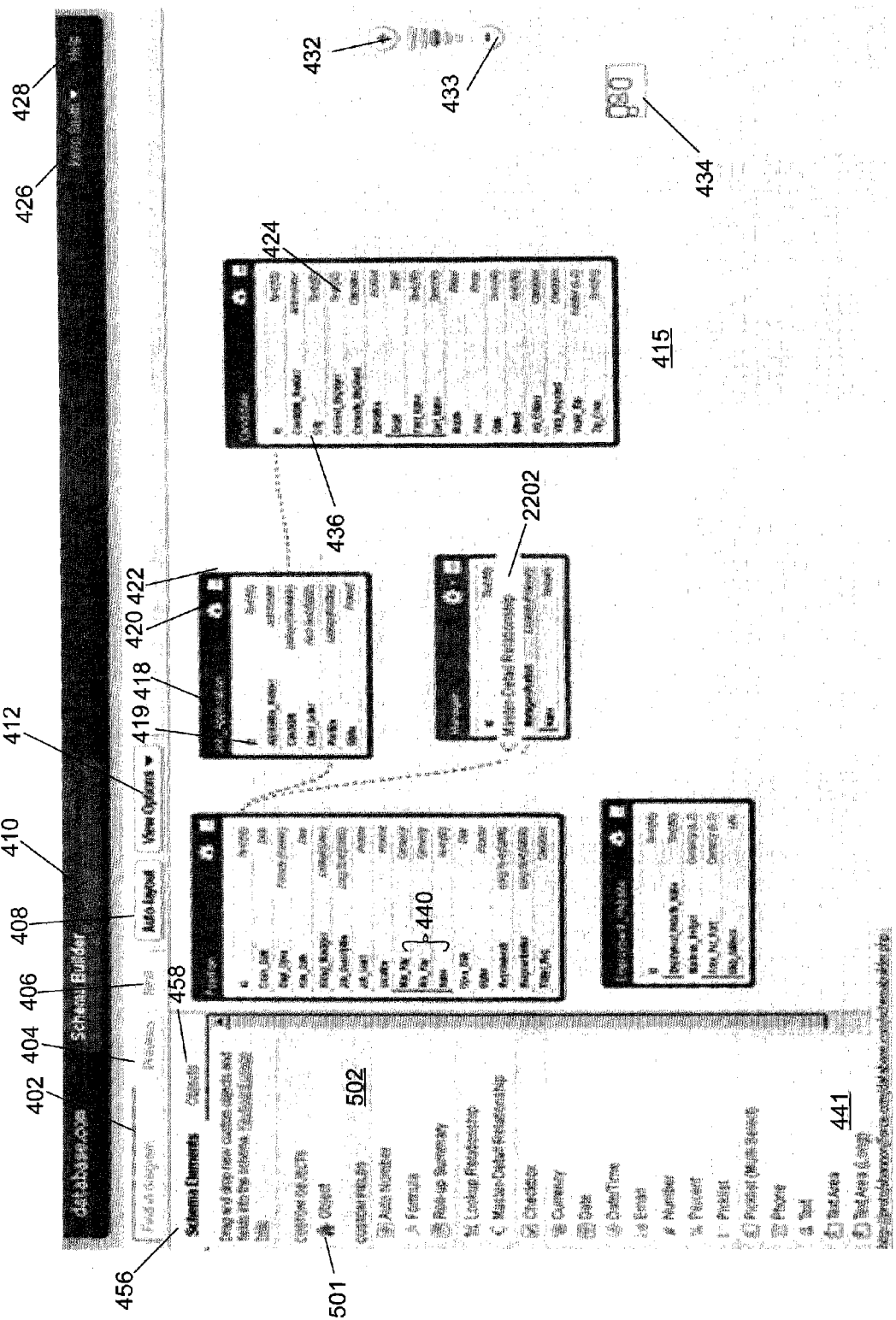
FIG. 22 is a screenshot illustrating an embodiment of the dragging and dropping of a relationship type onto a selected object of the schema.

FIG. 22 is a screenshot of an embodiment of an add master-detail webpage 2200. Add master-detail webpage 2200 may include find 402, previous button 404, next button 406, auto-layout button 408, schema builder 410, view options 412, options 414, canvas 415, data objects 418, ID fields 419, data object menu 420, expand/collapse object 422, field type 424, user 426, help 428, legend 430, zoom 432, map 434, field 436, lookup relationship 438, required fields 440, navigation window 441, clear 442, select 444, unselected data object 446, selected data object 448, quick find 452, selection 454, schema elements 456, objects 458, custom object 501, custom fields 502, new data object 902 and master-detail relationship field 2202. In other embodiments, add master-detail webpage 2200 may not have all of the elements listed and/or may have other elements instead of or in addition to those listed.

Add master-detail webpage 2200 is a webpage in which the drag and drop feature of the schema builder is being used to add a field for adding a master-detail relationship. Master-detail relationship field 2202 has been dragged from custom fields 502 and dropped into the graphical representation of the data object "manager." Dropping data field master-detail relationship into the graphical representation of object "manager" adds a master-detail relationship field to data object "manager" in the schema builder.

Figure 23:
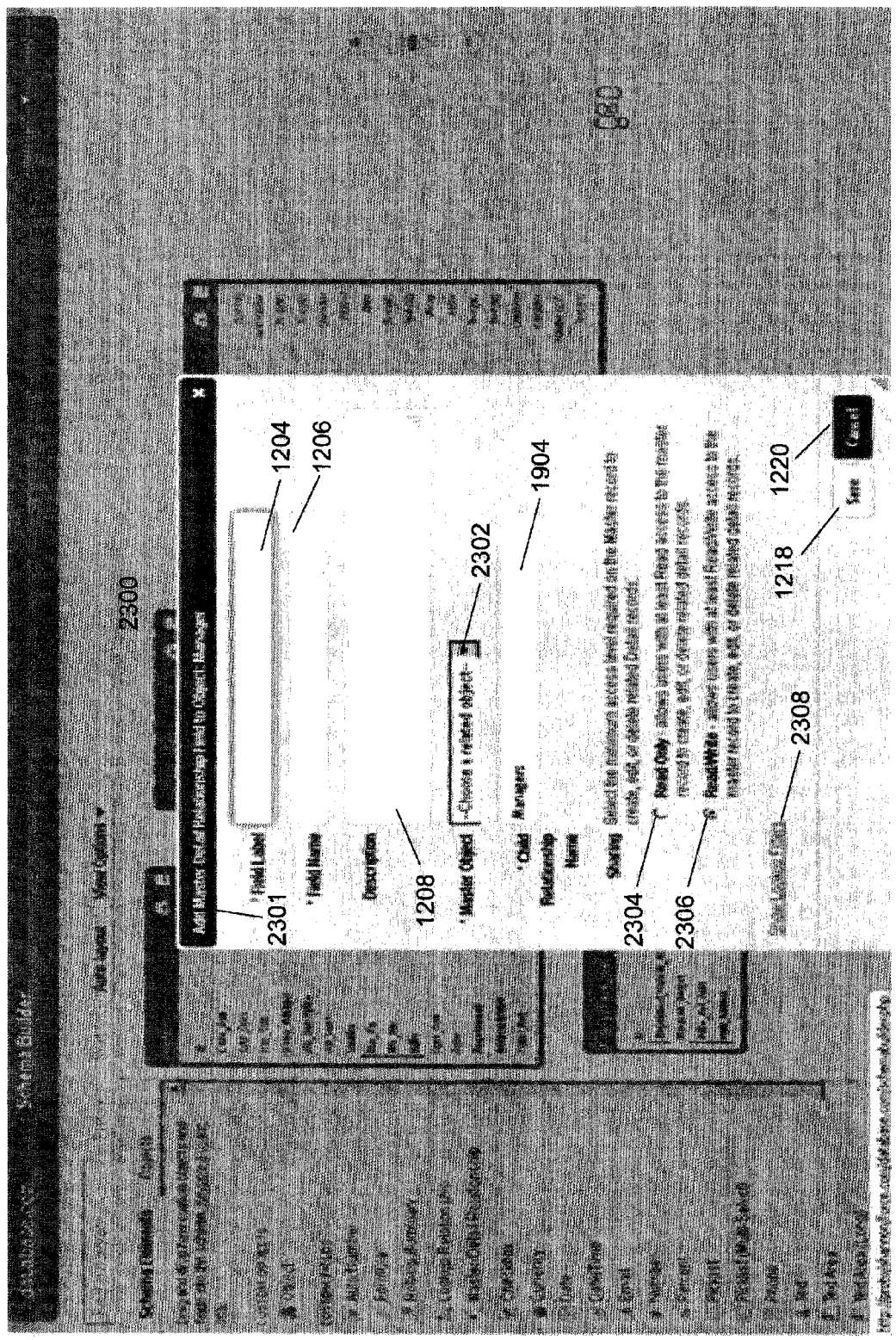
FIG. 23 is a screenshot of illustrating an embodiment of a dialogue box presented to a user when a master-detail relationship is assigned to a data object.

FIG. 23 is a screenshot of an embodiment of define object box 2300. Define object box 2300 may include field label 1204, filed name 1206, description 1208, save 1218, cancel 1220, title 2301, master object 2302, read 1904, read write 2306 and show lookup filters 2308. In other embodiments, define object box 2300 may not have all of the elements listed and/or may have other elements instead of or in addition to those listed.

Title 2301 displays the title of the dialogue box for defining the details of the master-detail field. Title 2301 also displays the name of the data object to which the field is being added to. Title 2301 explains that the dialogue box is used for adding a master-detail field to the specified data object. Master object 2302 is a pull down menu with a selection of master objects. Read 2304 is a radio button for granting users read only access to the master record to create, edit, or delete related detail records. Read-write 2306 is a radio button granting users read and write access to the master record to create, edit or delete related detail records. Show lookup filters is a link, which when selected displays the lookup filters. After the master-detail field is created, information from the master data object will be used to fill fields and/or create records in the child data object.

System Overview

Figure 24:
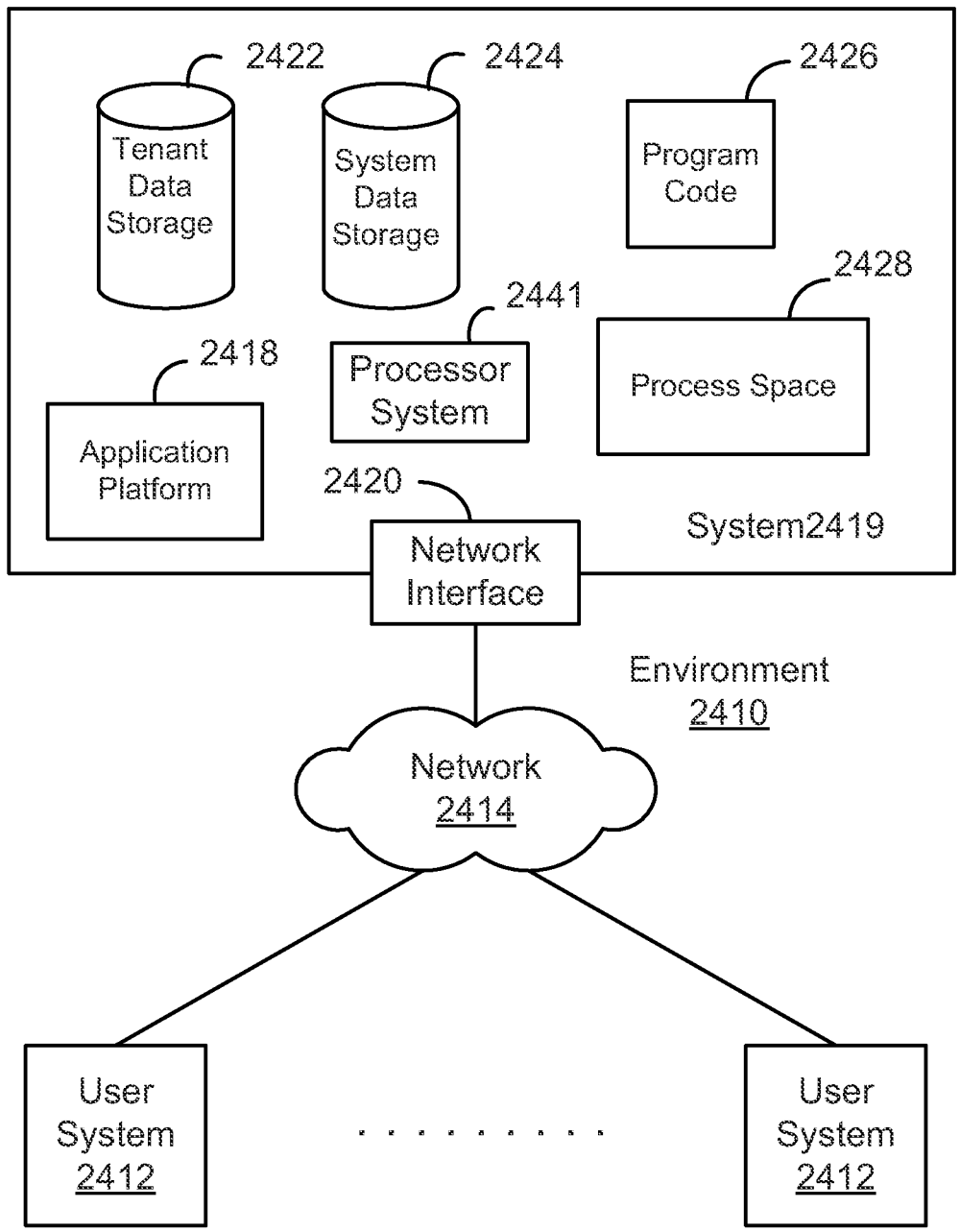
FIG. 24 illustrates a block diagram of an example of an environment wherein an on-demand database service might be used.

FIG. 24 illustrates a block diagram of an environment 2410 wherein an on-demand database service might be used. Environment 2410 may include user systems 2412, network 2414, system 2416, processor system 2417, application platform 2418, network interface 2420, tenant data storage 2422, system data storage 2424, program code 2426, and process space 2428. In other embodiments, environment 2410 may not have all of the components listed and/or may have other elements instead of, or in addition to, those listed above.

Environment 2410 is an environment in which an on-demand database service exists. User system 2412 may be any machine or system that is used by a user to access a database user system. For example, any of user systems 2412 can be a handheld computing device, a mobile phone, a laptop computer, a work station, and/or a network of computing devices. As illustrated in FIG. 24 (and in more detail in FIG. 25) user systems 2412 might interact via a network 2414 with an on-demand database service, which is system 2416.

An on-demand database service, such as system 2416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 2416" and "system 2416" will be used interchangeably herein. A database image may include one or more database objects. A relational database management system (RDMS) or the equivalent may execute storage and retrieval of information against the database object(s). Application platform 2418 may be a framework that allows the applications of system 2416 to run, such as the hardware and/or software, e.g., the operating system. In an embodiment, on-demand database service 2416 may include an application platform 2418 that enables creation, managing and executing one or more applications developed by the provider of the on-demand database service, users accessing the on-demand database service via user systems 2412, or third party application developers accessing the on-demand database service via user systems 2412.

The users of user systems 2412 may differ in their respective capacities, and the capacity of a particular user system 2412 might be entirely determined by permissions (permission levels) for the current user. For example, where a salesperson is using a particular user system 2412 to interact with system 2416, that user system has the capacities allotted to that salesperson. However, while an administrator is using that user system to interact with system 2416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 2414 is any network or combination of networks of devices that communicate with one another. For example, network 2414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 2412 might communicate with system 2416 using TCP/IP and, at a higher network level, use other common Internet protocols to communicate, such as HTTP, FTP, AFS, WAP, etc. In an example where HTTP is used, user system 2412 might include an HTTP client commonly referred to as a "browser" for sending and receiving HTTP messages to and from an HTTP server at system 2416. Such an HTTP server might be implemented as the sole network interface between system 2416 and network 2414, but other techniques might be used as well or instead. In some implementations, the interface between system 2416 and network 2414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 2416, shown in FIG. 24, implements a web-based customer relationship management (CRM) system. For example, in one embodiment, system 2416 includes application servers configured to implement and execute CRM software applications as well as provide related data, code, forms, webpages and other information to and from user systems 2412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 2416 implements applications other than, or in addition to, a CRM application. For example, system 2416 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 2416.

One arrangement for elements of system 2416 is shown in FIG. 24, including a network interface 2420, application platform 2418, tenant data storage 2422 for tenant data 2523, system data storage 2424 for system data 2525 accessible to system 2416 and possibly multiple tenants, program code 2426 for implementing various functions of system 2416, and a process space 2428 for executing MTS system processes and tenant-specific processes, such as running applications as part of an application hosting service. Additional processes that may execute on system 2416 include database indexing processes.

Several elements in the system shown in FIG. 24 include conventional, well-known elements that are explained only briefly here. For example, each user system 2412 could include a desktop personal computer, workstation, laptop, PDA, cell phone, or any wireless access protocol (WAP) enabled device or any other computing device capable of interfacing directly or indirectly to the Internet or other network connection. User system 2412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 2412 to access, process and view information, pages and applications available to it from system 2416 over network 2414. Each user system 2412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 2416 or other systems or servers. For example, the user interface device can be used to access data and applications hosted by system 2416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 2412 and all of its components are operator configurable using applications, such as a browser, including computer code run using a central processing unit such as an Intel Pentium® processor or the like. Similarly, system 2416 (and additional instances of an MTS, where more than one is present) and all of their components might be operator configurable using application(s) including computer code to run using a central processing unit such as processor system 2417, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 2416 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 2416 is configured to provide webpages, forms, applications, data and media content to user (client) systems 2412 to support the access by user systems 2412 as tenants of system 2416. As such, system 2416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 25:
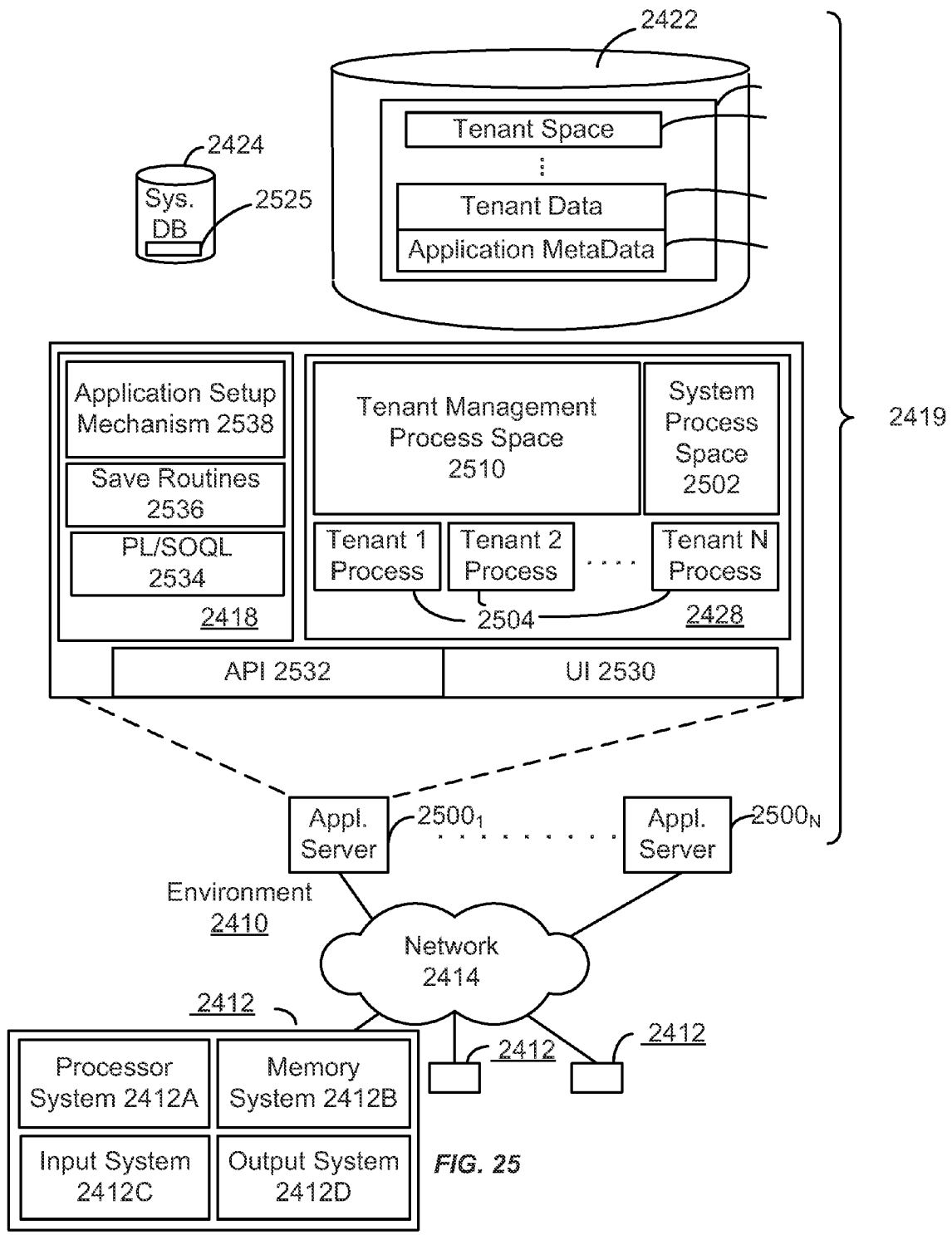
FIG. 25 illustrates a block diagram of an embodiment of elements of FIG. 24 and various possible interconnections between these elements.

FIG. 25 also illustrates environment 2410. However, in FIG. 25 elements of system 2416 and various interconnections in an embodiment are further illustrated. FIG. 25 shows that user system 2412 may include processor system 2412A, memory system 2412B, input system 2412C, and output system 2412D. FIG. 24 shows network 2414 and system 2416. FIG. 25 also shows that system 2416 may include tenant data storage 2422, tenant data 2523, system data storage 2424, system data 2525, User Interface (UI) 2530, Application Program Interface (API) 2532, PL/SOQL 2534, save routines 2536, application setup mechanism 2538, applications servers $2500_1$-$2700_N$, system process space 2402, tenant process spaces 2404, tenant management process space 2410, tenant storage area 2412, user storage 2414, and application metadata 2416. In other embodiments, environment 2410 may not have the same elements as those listed above and/or may have other elements instead of, or in addition to, those listed above.

User system 2412, network 2414, system 2416, tenant data storage 2422, and system data storage 2424 were discussed above in FIG. 24. Regarding user system 2412, processor system 2412A may be any combination of one or more processors. Memory system 2412B may be any combination of one or more memory devices, short term, and/or long term memory. Input system 2412C may be any combination of input devices, such as one or more keyboards, mice, trackballs, scanners, cameras, and/or interfaces to networks. Output system 2412D may be any combination of output devices, such as one or more monitors, printers, and/or interfaces to networks. As shown by FIG. 24, system 2416 may include a network interface 2420 (of FIG. 24) implemented as a set of HTTP application servers 2500, an application platform 2418, tenant data storage 2422, and system data storage 2424. Also shown is system process space 2402, including individual tenant process spaces 2404 and a tenant management process space 2410. Each application server 2500 may be configured to tenant data storage 2422 and the tenant data 2523 therein, and system data storage 2424 and the system data 2525 therein to serve requests of user systems 2412. The tenant data 2523 might be divided into individual tenant storage areas 2412, which can be either a physical arrangement and/or a logical arrangement of data. Within each tenant storage area 2412, user storage 2414 and application metadata 2416 might be similarly allocated for each user. For example, a copy of a user's most recently used (MRU) items might be stored to user storage 2414. Similarly, a copy of MRU items for an entire organization that is a tenant might be stored to tenant storage area 2412. A UI 2530 provides a user interface and an API 2532 provides an application programmer interface to system 2416 resident processes to users and/or developers at user systems 2412. The tenant data and the system data may be stored in various databases, such as one or more Oracle™ databases.

Application platform 2418 includes an application setup mechanism 2538 that supports application developers' creation and management of applications, which may be saved as metadata into tenant data storage 2422 by save routines 2536 for execution by subscribers as one or more tenant process spaces 2404 managed by tenant management process 2410 for example. Invocations to such applications may be coded using PL/SOQL 2534 that provides a programming language style interface extension to API 2532. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 2416 for the subscriber making the invocation and executing the metadata as an application in a virtual machine.

Each application server 2500 may be communicably coupled to database systems, e.g., having access to system data 2525 and tenant data 2523, via a different network connection. For example, one application server $2500_1$ might be coupled via the network 2414 (e.g., the Internet), another application server $2500_{N-1}$ might be coupled via a direct network link, and another application server $2500_N$ might be coupled by yet a different network connection. Transfer Control Protocol and Internet Protocol (TCP/IP) are typical protocols for communicating between application servers 2500 and the database system. However, it will be apparent to one skilled in the art that other transport protocols may be used to optimize the system depending on the network interconnect used.

In certain embodiments, each application server 2500 is configured to handle requests for any user associated with any organization that is a tenant. Because it is desirable to be able to add and remove application servers from the server pool at any time for any reason, there is preferably no server affinity for a user and/or organization to a specific application server 2500. In one embodiment, therefore, an interface system implementing a load balancing function (e.g., an F5 Big-IP load balancer) is communicably coupled between the application servers 2500 and the user systems 2412 to distribute requests to the application servers 2500. In one embodiment, the load balancer uses a least connections algorithm to route user requests to the application servers 2500. Other examples of load balancing algorithms, such as round robin and observed response time, also can be used. For example, in certain embodiments, three consecutive requests from the same user could hit three different application servers 2500, and three requests from different users could hit the same application server 2500. In this manner, system 2416 is multi-tenant, wherein system 2416 handles storage of, and access to, different objects, data and applications across disparate users and organizations.

As an example of storage, one tenant might be a company that employs a sales force where each salesperson uses system 2416 to manage their sales process. Thus, a user might maintain contact data, leads data, customer follow-up data, performance data, goals and progress data, etc., all applicable to that user's personal sales process (e.g., in tenant data storage 2422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 2416 that are allocated at the tenant level while other data structures might be managed at the user level.

Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 2416 might also maintain system level data usable by multiple tenants or other data. Such system level data might include industry reports, news, postings, and the like that are sharable among tenants.

In certain embodiments, user systems 2412 (which may be client systems) communicate with application servers 2500 to request and update system-level and tenant-level data from system 2416 that may require sending one or more queries to tenant data storage 2422 and/or system data storage 2424. System 2416 (e.g., an application server 2500 in system 2416) automatically generates one or more SQL statements (e.g., one or more SQL queries) that are designed to access the desired information. System data storage 2424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Method for Using the Environment (FIGS. 24 and 24)

Figure 26:
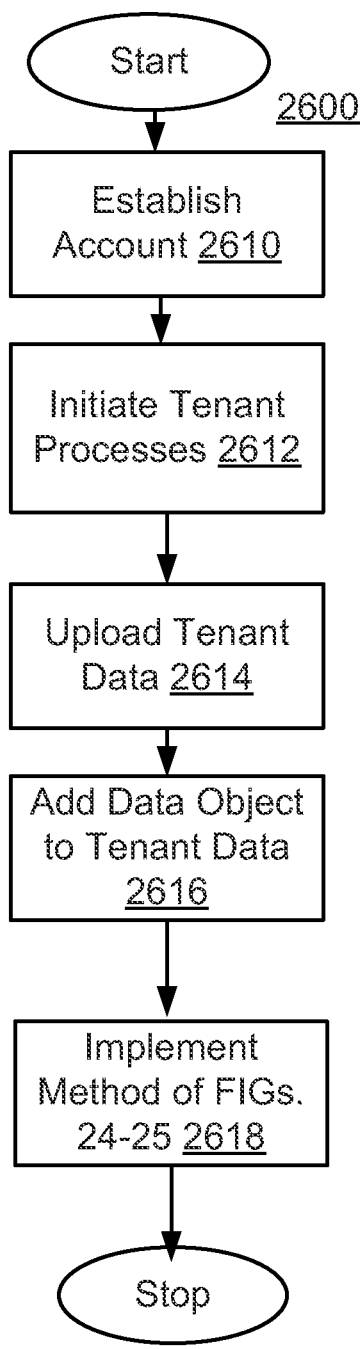
FIG. 26 is a flowchart of an example of a method of using the environment of FIGS. 24 and 25.

FIG. 26 shows a flowchart of an example of a method 2600 of using environment 2410. In step 2610, user system 2412 (FIGS. 24 and 24) establishes an account. In step 2612, one or more tenant process space 2504 (FIG. 25) are initiated on behalf of user system 2412, which may also involve setting aside space in tenant space 2512 (FIG. 25) and tenant data 2514 (FIG. 25) for user system 2412. Step 2612 may also involve modifying application metadata to accommodate user system 2412. In step 2614, user system 2412 uploads data. In step 2616, one or more data objects are added to tenant data 2514 where the data uploaded is stored. In step 2618, the methods associated with FIGS. 24-25 may be implemented. In another embodiment, although depicted as distinct steps in FIG. 26, steps 2602-2618 may not be distinct steps. In other embodiments, method 2600 may not have all of the above steps and/or may have other steps in addition to, or instead of, those listed above. The steps of method 2600 may be performed in another order. Subsets of the steps listed above as part of method 2600 may be used to form their own method.

Method for Creating the Environment (FIGS. 24 and 25)

Figure 27:
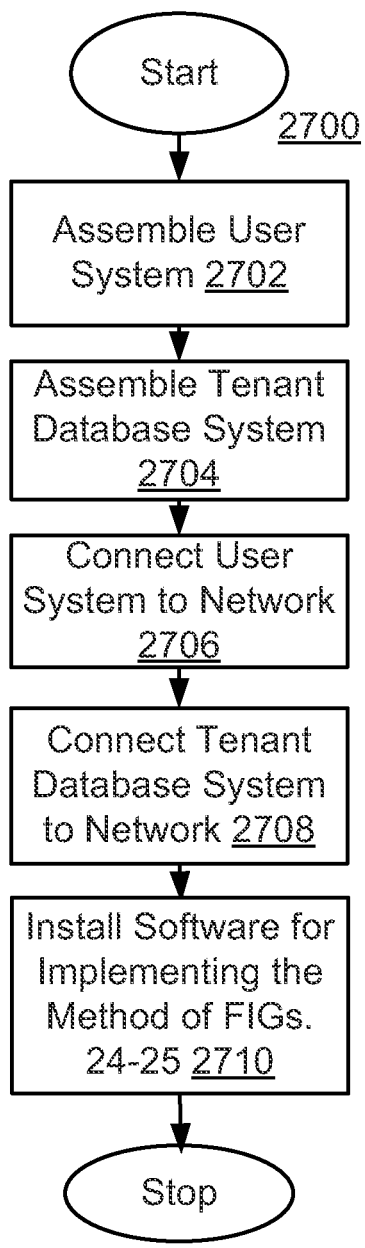
FIG. 27 is a flowchart of an example of a method of making the environment of FIGS. 24 and 25.

FIG. 27 is a method of making environment 2410, in step 2702, user system 2412 (FIGS. 24 and 25) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another.

In step 2704, system 2416 (FIGS. 24 and 25) is assembled, which may include communicatively coupling one or more processors, one or more memory devices, one or more input devices (e.g., one or more mice, keyboards, and/or scanners), one or more output devices (e.g., one more printers, one or more interfaces to networks, and/or one or more monitors) to one another. Additionally assembling system 2416 may include installing application platform 2418, network interface 2420, tenant data storage 2422, system data storage 2424, system data 2525, program code 2426, process space 2428, UI 2530, API 2532, PL/SOQL 2534, save routine 2536, application setup mechanism 2538, applications servers 100$_1$-100$_N$, system process space 102, tenant process spaces 2504, tenant management process space 110, tenant space 2512, tenant data 2514, and application metadata 116 (FIG. 25).

In step 2706, user system 2412 is communicatively coupled to network 2504. In step 2708, system 2416 is communicatively coupled to network 2504 allowing user system 2412 and system 2416 to communicate with one another (FIG. 25). In step 2710, one or more instructions may be installed in system 2416 (e.g., the instructions may be installed on one or more machine readable media, such as computer readable media, therein) and/or system 2416 is otherwise configured for performing the steps of methods associated with FIGS. 24-25. In an embodiment, each of the steps of method 2700 is a distinct step. In another embodiment, although depicted as distinct steps in FIG. 27, steps 2702-2710 may not be distinct steps. In other embodiments, method 2700 may not have all of the above steps and/or may have other steps in addition to, or instead of, those listed above. The steps of method 2700 may be performed in another order. Subsets of the steps listed above as part of method 2700 may be used to form their own method.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

Extensions and Alternatives

Each embodiment disclosed herein may be used or otherwise combined with any of the other embodiments disclosed. Any element of any embodiment may be used in any embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for defining a database schema comprising:
sending, from a host machine to a user machine, a graphical representation of a schema, the host machine having one or more processors and a memory system, the graphical representation including:
a plurality of graphical objects representing a plurality of database objects, each of the graphical objects representing a different one of database objects, and
at least two types of lines having graphically different appearances, each line connecting at least two of the plurality of graphical objects, a first type of line represents a master-detail relationship between a first and second database object and a second type of line representing a lookup relationship between a third database object and a fourth database object, the second database object inheriting at least one usage constraint defined by the first database object and the third database object including at least one field that receives its values from at least one field of the fourth database object,
receiving, at the host machine, user input from the client machine in the form of altering a graphical object of the graphical representation of the database schema;
altering the database schema in response to the input.

2. The method of claim 1, further comprising sending, by the host computer, rendering information for rendering a display of the altered graphical representations of the database schema.

3. The method of claim 1, the altering of the database schema further comprises adding at least a database object by adding a graphical representation of the database object.

4. The method of claim 1, the altering of the database schema further comprises deleting at least a database table by deleting a graphical representation of the database table from a graphical representation of at least a portion of a database schema, the graphical representation of at least the portion of the database schema including multiple graphical representations of database tables, the graphical representation of at least the portion of the database schema being located on a graphical canvas.

5. The method of claim 4, the altering at least the database schema further includes adding at least a data field by at least adding a graphical representation of the data field to a graphical representation of the database table.

6. The method of claim 3, wherein sending the rendering information includes sending rendering information for at least rendering a rectangular box representing a database table.

7. The method of claim 3, wherein sending rendering information includes sending information for at least rendering the rectangular box including a rectangular region within the rectangular box representing a field.

8. A method for defining a database schema comprising:
receiving, at a host machine, user input for a change for a database schema from a client machine in the form of altering a at least one of a plurality of graphical objects element of a graphical representation of the database schema, the host machine including at least a processor system having one or more processors, and a memory system;
in response to the input, the processor system automatically altering the database schema in response to the input;
updating, by the host machine, the graphical representation of the database schema to graphically represent the at least one altered graphical object of the database schema;
sending, by the host machine, rendering information to the client machine for rendering a display of the updated graphical representations of the database schema, the rendering information including at least two lines having graphically different
a first type of line representing a master-detail relationship between a first database object and a second database object and
a second type of line representing a lookup relationship between a third database object and a fourth database object, the second database object inheriting at least one usage constraint defined by the first database object and the third database object including at least one field that receives its values from at least one field of the fourth database object.

9. A method for defining a database schema comprising:
receiving, at a host machine, user input from a client machine in the form of altering at least one of a plurality of graphical objects of a graphical representation of a database schema, the host machine having one or more processors and a memory system;
altering the database schema in response to the input;
updating, by the host machine, the graphical representation of the database schema to graphically represent the at least one altered graphical object of the database schema;
sending, by the host machine, rendering information to the client machine for rendering a display of the updated graphical representations of the database schema, the rendering information including at least two lines having graphically different appearances, each line connecting at least two of the plurality of graphical objects, a first type of line representing a master-detail relationship between a first database object and a second database object and a second type of line representing a lookup relationship between a third database object and a fourth database object, the second database object inheriting at least one usage constraint defined by the first database object and the third database object including at least one field that receives its values from at least one field of the fourth database object.

10. The method of claim 1, further comprising:
the sending of the rendering information for rendering a display of the graphical representation of the database schema including sending information for at least rendering the rectangular box;
the rectangular box including a rectangular region representing a field within the rectangular box.

11. The method of claim 1, the altering of the database schema further comprises setting user permission to access the database schema.

12. The method of claim 2, wherein the rendering information further comprises information for rendering a navigational map of the graphical representation of the schema with a portion of the navigational map highlighted, the portion of the navigational map highlighted being the portion of the graphical representation of the schema that is displayed on a graphical canvas, the scale of the navigational map being smaller than the scale of the graphical representation of the schema.

13. The method of claim 4, further comprises adding a schema element by dragging and dropping a corresponding graphical elements from a menu to the canvas.

14. A computer readable media storing one or more machine instructions, which when invoked carry out the method of claim 1.

15. A method of claim 1, the host system hosting a multi-tenant database.

16. The method of claim 1, wherein altering includes altering of the database schema including altering the relations between the two database objects.

17. The method of claim 1, the line representing the lookup relationship and the line representing the master-detail relationship appearing in the same graphical representations of a database.

18. The method of claim 1, each type of line having a different color.

19. The method of claim 1, the at least two types of line include a first type of line that is a solid line and a second type of line that is a dashed line.

* * * * *